US007570473B2

(12) United States Patent
Adachi et al.

(10) Patent No.: US 7,570,473 B2
(45) Date of Patent: Aug. 4, 2009

(54) SURGE ABSORBER

(75) Inventors: Miki Adachi, Naka (JP); Toshiaki Ueda, Naka (JP)

(73) Assignee: Mitsubishi Materials Corporation, Tokyo (JP)

( * ) Notice: Subject to any disclaimer, the term of this patent is extended or adjusted under 35 U.S.C. 154(b) by 48 days.

(21) Appl. No.: 11/572,177

(22) PCT Filed: Jul. 14, 2005

(86) PCT No.: PCT/JP2005/012993

§ 371 (c)(1), (2), (4) Date: Jan. 16, 2007

(87) PCT Pub. No.: WO2006/009055

PCT Pub. Date: Jan. 26, 2006

(65) Prior Publication Data

US 2008/0049370 A1 Feb. 28, 2008

(30) Foreign Application Priority Data

| | | |
|---|---|---|
| Jul. 15, 2004 | (JP) | 2004-208467 |
| Aug. 4, 2004 | (JP) | 2004-227773 |
| Aug. 4, 2004 | (JP) | 2004-227774 |

(51) Int. Cl.
*H02H 1/00* (2006.01)

(52) U.S. Cl. ........ 361/120; 361/117

(58) Field of Classification Search ......... 361/117-120, 361/127

See application file for complete search history.

(56) References Cited

U.S. PATENT DOCUMENTS

| | | | | |
|---|---|---|---|---|
| 5,235,247 | A | 8/1993 | Shishido et al. | |
| 5,336,970 | A | 8/1994 | Einbinder | |
| 5,559,663 | A * | 9/1996 | Tanaka et al. | 361/127 |
| 5,671,114 | A * | 9/1997 | Daumer et al. | 361/120 |
| 6,529,361 | B1 * | 3/2003 | Petschel et al. | 361/120 |
| 7,053,536 | B1 * | 5/2006 | Boman et al. | 313/231.11 |

FOREIGN PATENT DOCUMENTS

| | | |
|---|---|---|
| CN | 2383211 Y | 6/2000 |
| JP | 41-2817 | 2/1966 |
| JP | 63-41749 | 11/1988 |
| JP | 5-36460 | 2/1993 |
| JP | 6-84579 | 3/1994 |
| JP | 10-106712 | 4/1998 |
| JP | 2860335 | 2/1999 |
| JP | 2000-268934 | 9/2000 |
| JP | 2001-57283 | 2/2001 |

* cited by examiner

*Primary Examiner*—Danny Nguyen
(74) *Attorney, Agent, or Firm*—Darby & Darby P.C.

(57) ABSTRACT

There is provided a surge absorber which has excellent chemical stability in a high-temperature region upon a sealing process and main discharge and has a long life span, by applying an oxide layer having excellent adhesion to a main discharge surface. A columnar ceramics in which conductive coating films are separately formed via a discharge gap, a pair of main discharge electrode members which face each other and are in contact with the conductive coating films and a barrel-shaped ceramics in which the columnar ceramics is enclosed together with sealing gas are included, and a glass member is enclosed in the barrel-shaped ceramics.

6 Claims, 30 Drawing Sheets

PRIOR ART

SURGE ABSORBER

CROSS REFERENCE TO PRIOR APPLICATION

This is a U.S. national phase application under 35 U.S.C. § 371 of International Patent Application No. PCT/JP2005/012993 filed Jul. 14, 2005, and claims the benefit of Japanese Applications No. 2004-208467 filed Jul. 15, 2004, 2004-227773 filed Aug. 4, 2004 and 2004-227774 filed Aug. 4, 2004, all of them are incorporated by reference herein. The International Application was published in Japanese on Jan. 26, 2006 as International Publication No. WO/2006/009055 under PCT Article 21(2).

TECHNICAL FIELD

The present invention relates to a surge absorber for protecting various apparatuses from surge and preventing an accident from occurring.

BACKGROUND ART

In communication electronic apparatuses such as telephones, facsimiles or modems, a portion which is prone to be subjected to electrical shock due to abnormal current (surge current) or abnormal voltage (surge voltage) such as lightning surge or static electricity, including a portion connected to a communication line, a power supply line, an antenna, a CRT driving circuit or the like, is connected with a surge absorber, in order to prevent breaking such as thermal damage or firing of an electronic apparatus or a printed board, on which the electronic apparatus is mounted, due to the abnormal voltage.

Conventionally, for example, a surge absorber using a surge absorbing element having a micro gap has been suggested. This surge absorber is a discharge type surge absorber in which the so-called micro gap is formed in the circumferential surface of a columnar ceramic member covered with a conductive coating film, the surge absorbing element having a pair of cap electrodes located at the both ends of the ceramic member is received in a glass tube together with sealing gas and a sealing electrode having lead wires on the both ends of the cylindrical glass tube is sealed by high-temperature heating.

Recently, in even the discharge type surge absorber, a long life span has been required. As an example of such a surge absorber, there is provided a surge absorber in which, as a covering layer, an $SnO_2$ film having lower volatility upon discharge than that of the cap electrode is formed on a surface where main discharge of the cap electrode is performed. By such a configuration, a metallic component of the cap electrode upon the main discharge is suppressed from being scattered to the inner wall of the glass tube or the micro gap and thus a long life span is realized (for example, see Japanese Unexamined Patent Application Publication No. 10-106712 (page 5 and FIG. 1)).

Further, with miniaturization of the apparatuses, surface mounting is becoming more widespread. As an example of such a surge absorber, there is provided a surface mounting type (metal electrode facebonding (MELF) type) surge absorber in which a lead wire does not exist in a sealing electrode and the sealing electrode is connected and fixed to a board by soldering upon mounting (for example, see Japanese Unexamined Patent Application Publication No. 2000-268934 (FIG. 1)).

As shown in FIG. 30, a surge absorber 300 includes plate-shaped ceramics 153 in which conductive coating films 152 are separately formed on a surface thereof via a discharge gap 151 located at a central portion, a pair of sealing electrodes 155 disposed on the both ends of the plate-shaped ceramics 153, and a barrel-shaped ceramics 157 in which the sealing electrodes 155 are disposed on the both ends thereof and the plate-shaped ceramics 153 is sealed together with sealing gas 156.

Each of the sealing electrodes 155 includes a terminal electrode member 158 and a leaf spring conductor 159 which is electrically connected to the terminal electrode member 158 and is in contact with the conductive coating film 152.

However, with respect to the above-mentioned conventional surge absorber, the following problem exists. That is, in the conventional surge absorber, the $SnO_2$ coating film is, for example, formed by a thin-film forming method such as a chemical vapor deposition (CVD) method. However, since the adhesion of the $SnO_2$ coating film to the cap electrode is weak, the property of the $SnO_2$ coating film cannot be sufficiently accomplished by stripping of the $SnO_2$ coating film.

SUMMARY OF THE INVENTION

The present invention is made to solve the above-described problem and it is an object of the present invention to provide a surge absorber which has excellent chemical stability in a high-temperature region upon a sealing process and main discharge and which has a long life span, by applying an oxide layer having excellent adhesion to a main discharge surface.

The present invention employs the following configurations in order to solve the above-described problem. That is, according to the present invention, there is provided a surge absorber including: an insulating member in which conductive coating films are separately formed via a discharge gap; a pair of main discharge electrode members which face each other and are in contact with the conductive coating films; and an insulating tube in which the insulating member is enclosed together with sealing gas, wherein a glass member is enclosed in the insulating tube.

According to the present invention, abnormal current and abnormal voltage such as external surge is absorbed by triggering discharge in the discharge gap and performing main discharge between the main discharge surfaces which are the facing surfaces of the pair of main discharge electrode members. Here, upon a sealing process of sealing the insulating member in the insulating tube together with the sealing gas or upon the main discharge, the glass member is heated and molten. Accordingly, since the glass member functions as a covering agent, the main discharge surface is covered with the glass member. Since the glass member functions as an oxidizing agent, the main discharge surface is covered with the oxide layer formed of the metallic component of the main discharge surface. Accordingly, since the main discharge surface is covered with the glass member or the oxide layer, the metallic component of the main discharge surface is suppressed from being scattered to be adhered to the inner wall of the insulating tube or the discharge gap upon the main discharge.

Even when the glass member or the oxide layer which covers the main discharge surface is damaged by the main discharge, the damaged portion is covered with the glass member of the other portion which is heated and molten.

Accordingly, the metallic component of the main discharge surface is suppressed from being scattered and thus a long life span of the surge absorber can be realized.

Since expensive metal which has excellent chemical stability in a high-temperature region need not be used as the main discharge electrode member, it is possible to use a cheap metal material in the main discharge electrode member.

In addition, in the surge absorber according to the present invention, it is preferable that the glass member covers an inner wall of the insulating tube.

According to the present invention, upon the sealing process or the main discharge, the glass member which covers the inner wall of the insulating tube is heated and molten to cover the main discharge surface. Since the glass member functions as an oxidizing agent, the main discharge surface is covered with the oxide layer formed of the metallic component of the main discharge surface.

In addition, in the surge absorber according to the present invention, it is preferable that oxide films are formed on main discharge surfaces which are facing surfaces of the pair of main discharge electrode members by an oxidation treatment.

According to the present invention, it is possible to provide the main discharge surface having excellent chemical stability in a high-temperature region. Since the oxide film has excellent adhesion to the main discharge surface, it is possible to accomplish the property of the oxide film.

According to the present invention, there is provided a surge absorber including: an insulating member in which conductive coating films are separately formed via a discharge gap; a pair of main discharge electrode members which face each other and are in contact with the conductive coating films; and an insulating tube in which the insulating member is enclosed together with sealing gas, wherein a glass member is charged in the insulating tube to extend from one of the pair of main discharge electrode members to the other of the pair of main discharge electrode members.

In addition, in the surge absorber according to the present invention, it is preferable that the glass member has a granular shape.

In addition, in the surge absorber according to the present invention, it is preferable that the glass member is foam glass.

According to the present invention, the granular glass member or the foam glass is charged in the insulating tube.

In addition, in the surge absorber according to the present invention, it is preferable that oxide films are formed on main discharge surfaces which are facing surfaces of the pair of main discharge electrode members by an oxidation treatment.

According to the present invention, it is possible to provide a main discharge surface having excellent chemical stability in a high-temperature region. Since the oxide film has excellent adhesion to the main discharge surface, it is possible to accomplish the property of the oxide film.

According to the present invention, there is provided a surge absorber including: an insulating member in which conductive coating films are separately formed via a discharge gap; a pair of main discharge electrode members which face each other and are in contact with the conductive coating films; and an insulating tube in which the insulating member is enclosed together with sealing gas, wherein main discharge surfaces which are facing surfaces of the pair of main discharge electrode members are covered with a glass member.

In addition, in the surge absorber according to the present invention, it is preferable that oxide films are formed on the main discharge surfaces by an oxidation treatment.

According to the present invention, it is possible to provide the main discharge surface having excellent chemical stability in a high-temperature region. Since the oxide film has excellent adhesion to the main discharge surface, it is possible to accomplish the property of the oxide film.

DETAILED DESCRIPTION OF THE PRESENT INVENTION

Hereinafter, a surge absorber according to an embodiment of the present invention will be described with reference to FIGS. 1 to 3.

Figure 1:
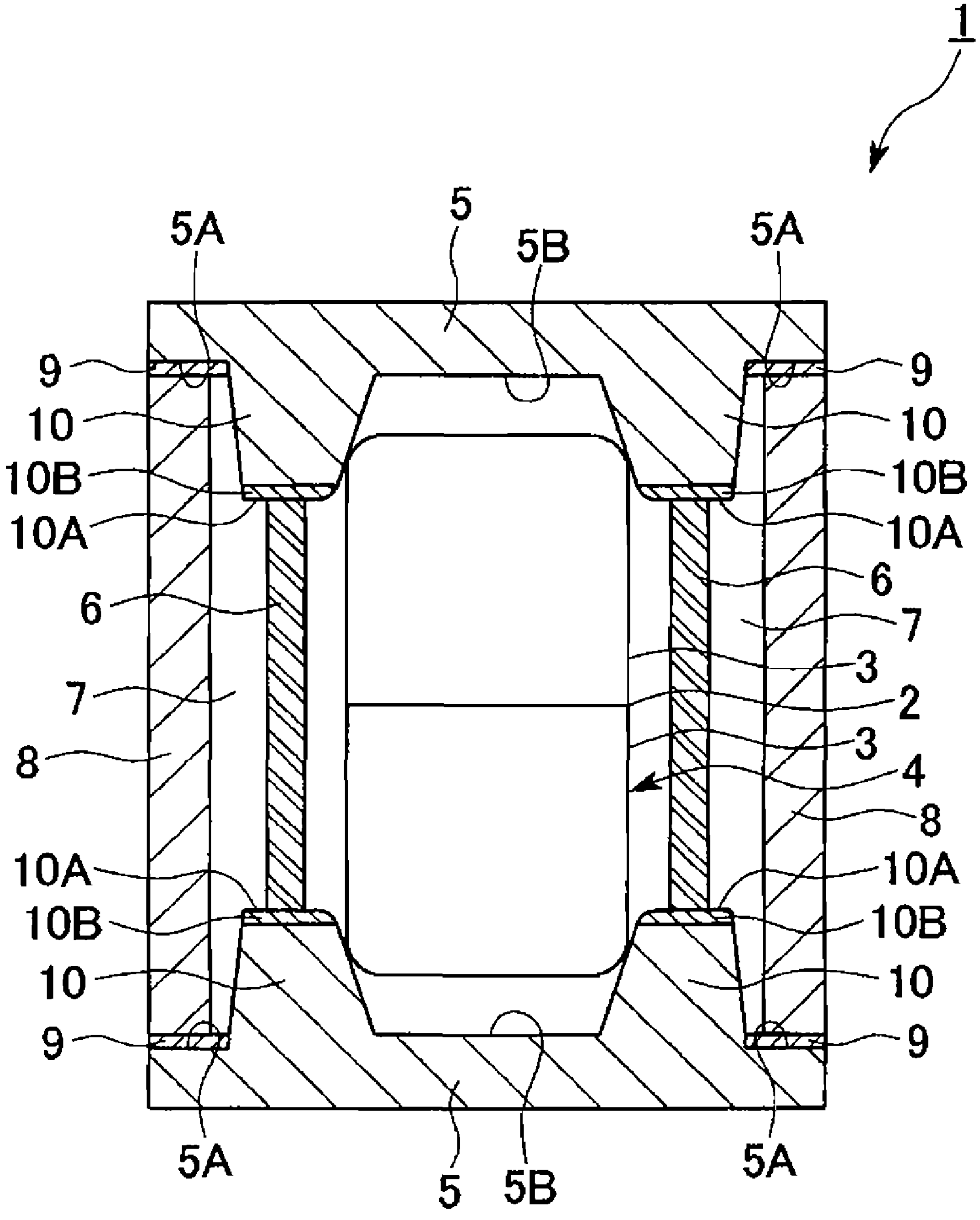
FIG. 1 is a cross-sectional view showing a surge absorber according to an embodiment of the present invention.

The surge absorber 1 according to the present embodiment is a discharge type surge absorber using a so-called micro gap, as shown in FIG. 1, and includes a columnar ceramics (insulating member) 4 in which conductive coating films 3 are separately formed on a main surface thereof via a discharge gap 2 located at the central portion, a pair of main discharge electrode members 5 which face each other at the both ends of the columnar ceramics 4 and are in contact with the conductive coating films 3, and a barrel-shaped ceramics (insulating tube) 8 in which the pair of main discharge electrode members 5 is disposed on the both ends thereof and the columnar ceramics 4 and a cylindrical glass member 6 are enclosed together with sealing gas 7 such as argon (Ar) having a composition which is adjusted so as to obtain a desired electrical property.

The columnar ceramics 4 is formed of a ceramic material such as a mullite ceramics and a thin film such as titanium nitride (TiN) is formed on the surface of the columnar ceramics as the conductive coating film 3 by a thin-film forming technology such as a physical vapor deposition (PVD) method a chemical vapor deposition (CVD) method.

Although one to one hundred discharge gap 2 may be formed by a laser cutting process, a dicing process or an etching process with a width of 0.01 to 1.5 mm, one discharge gap is formed with a width of 150 μm in the present embodiment.

The pair of main discharge electrode members 5 is formed of KOVAR (registered trademark) which is an alloy of iron (Fe), nickel (Ni) and cobalt (Co).

Figure 2A:
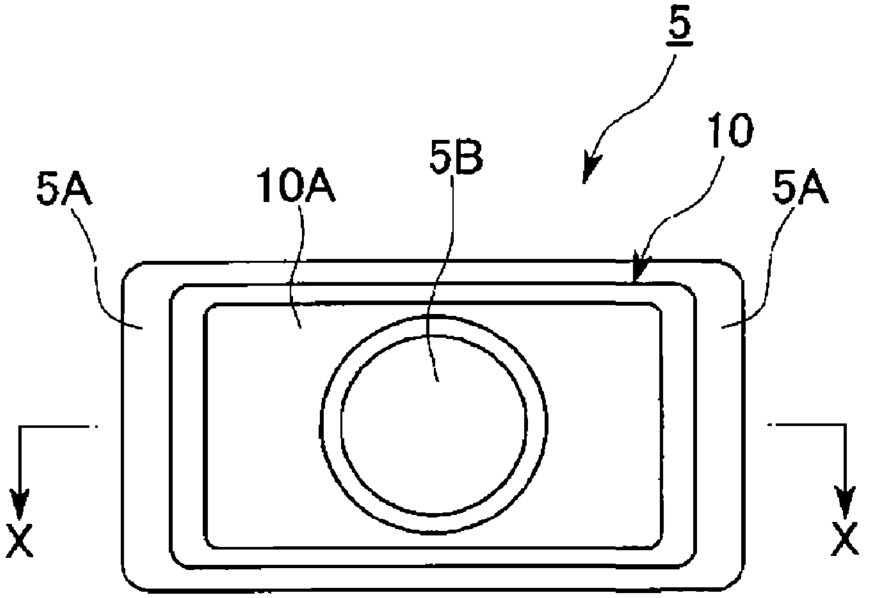
FIG. 2 shows a main discharge electrode member in FIG. 1, wherein FIG. 2(*a*) is a plan view thereof and FIG. 2(*b*) is a cross-sectional view taken along line X-X of FIG. 2(*a*).
Figure 2B:
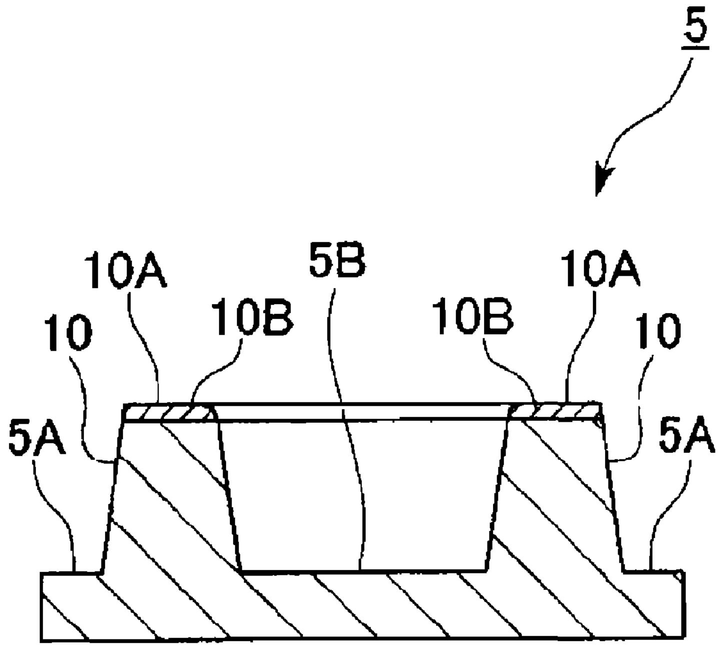

As shown in FIG. 2, each of the pair of main discharge electrode members 5 includes a rectangular peripheral portion 5A which is adhered to the end surface of the barrel-shaped ceramics 8 using a brazing material 9 and has an aspect ratio of 1 or less and a protruded supporting portion 10 which is axially protruded at the inside of the barrel-shaped ceramics 8 and supports the columnar ceramics 4. A central region 5B surrounded by the protruded supporting portion 10 is formed at a position facing the end of the columnar ceramics 4.

It is preferable that the protruded supporting portion 10 has a tapered diameter-direction internal surface such that the end of the columnar ceramics 4 is pressed or fitted into the diameter-direction internal surface. The facing surfaces of the front ends of the protruded supporting portions 10 are main discharge surfaces 10A.

Here, the main discharge surface 10A of the main discharge electrode member 5 is subjected to an oxidation treatment at 500° C. for 30 minutes in the atmosphere to form an oxide film 10B having an average thickness of 0.6 μm.

The cylindrical glass member 6 has a cylindrical shape, contains silicon oxide ($SiO_2$) and is interposed between the main discharge surfaces 10A of the pair of main discharge electrode members 5. The cylindrical glass member 6 does not have influence on the pressure of a discharge space formed by the main discharge electrode members 5 and the barrel-shaped ceramics 8.

The barrel-shaped ceramics 8 is formed of an insulating ceramics such as aluminum oxide ($Al_2O_3$) and is rectangular in cross section, and the cross-sectional dimension thereof is substantially equal to the dimension of the outer circumference of the peripheral portion 5A.

Next, a method of manufacturing the surge absorber 1 according to the present embodiment configured above will be described.

First, the pair of main discharge electrode members 5 is integrally formed in a desired shape by a punching process. The main discharge surfaces 10A are subjected to an oxidation treatment at 500° C. for 30 minutes in air to form the oxide film 10B having an average thickness of 0.6 μm.

Subsequently, for example, a metallization layer including a molybdenum-tungsten (Mo—W) layer and a Ni layer one layer by one layer is formed on the both end surfaces of the barrel-shaped ceramics 8 so as to improve wettability with the brazing material 9.

Next, the columnar ceramics 4 is mounted on the central region 5B of one of the main discharge electrode members 5 such that the diameter-directional internal surface is brought into contact with the end surface of the columnar ceramics 4. The cylindrical glass member 6 is mounted on the main discharge surface 10A. Then, the barrel-shaped ceramics 8 is mounted on the peripheral portion 5A of the other of the main discharge electrode members 5 in a state that the brazing material 9 is inserted between the peripheral portion 5A and the end surface of the barrel-shaped ceramics 8.

Thereafter, the main discharge electrode member 5 is mounted such that the upper side of the columnar ceramics 4 faces the central region 5B, and the diameter-directional internal surface is brought into contact with the main discharge electrode member 5. The brazing material 9 is inserted between the peripheral portion 5A and the end surface of the barrel-shaped ceramics 8.

The temporary assembly prepared as described above is sufficiently vacuumed and then heated in the sealing gas atmosphere until the brazing material 9 is molten to thereby seal the columnar ceramics 4, followed by a rapid cooling process. Accordingly, the surge absorber 1 is manufactured.

Figure 3:
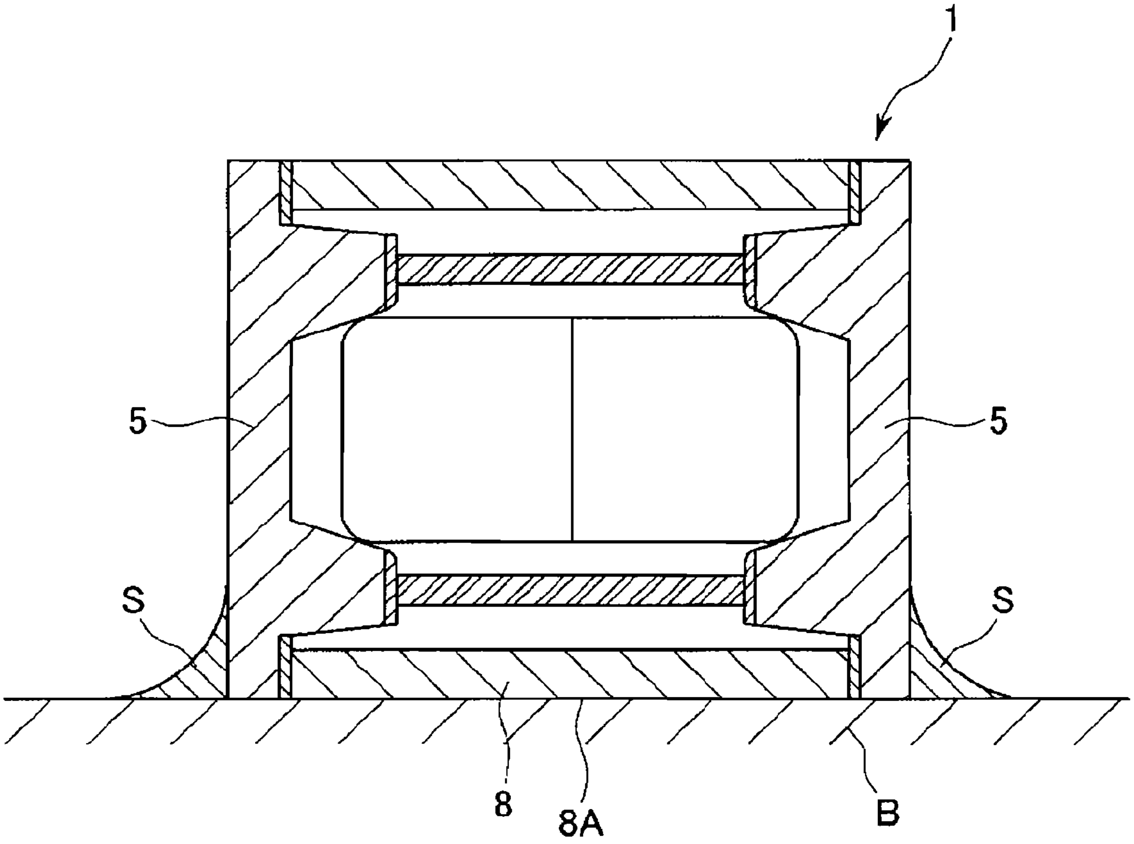
FIG. 3 is a cross-sectional view of the surge absorber of FIG. 1 mounted on a board.

The surge absorber 1 manufactured above, for example, as shown in FIG. 3, is mounted on a board B such as a printed board such that a mounted surface 8A which is one side surface of the barrel-shaped ceramics 8 is mounted on the board B and the board B and the outer surfaces of the pair of main discharge electrode members 5 are adhered and fixed by a solder S.

According to the surge absorber 1 configured above, since the cylindrical glass member 6, which is heated and molten, functions as a covering agent upon the sealing process or main discharge, the main discharge surface 10A is covered with the glass member. Further, since the cylindrical glass member 6 functions as an oxidizing agent, the main discharge surface 10A is covered with an oxide layer formed of a metallic component of the main discharge surface 10A. Accordingly, it is possible to suppress the metallic component of the main discharge surface 10A from being scattered to be adhered to the discharge gap 2 or the inner wall of the barrel-shaped ceramics 8. In addition, it is possible to suppress the metallic component of the main discharge surface 10A from being scattered by forming an oxide film 10B, which is chemically (thermodynamically) stable in a high-temperature region, on the main discharge surface 10A. Even when the glass member or the oxide film 10B which covers the main discharge surface 10A is damaged by the main discharge, the damaged portion is covered by the cylindrical glass member 6 of the other portion, which is heated and molten. Thus, the long life span of the surge absorber 1 can be realized.

Since expensive metal which has excellent chemical stability in a high-temperature region need not be used as the main discharge electrode member 5, it is possible to use a cheap metal material in the main discharge electrode member 5 in the present invention.

Figure 4:
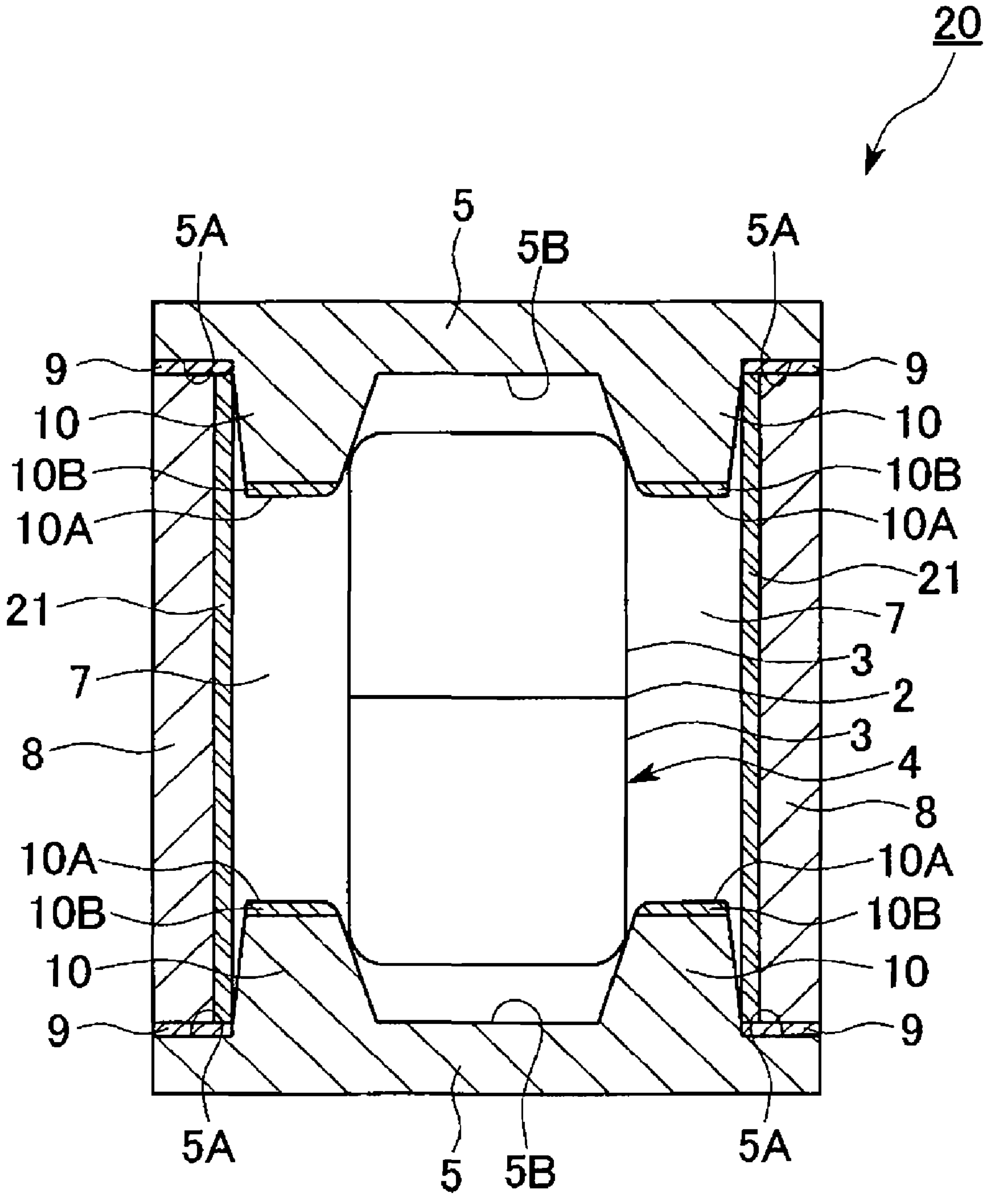
FIG. 4 is a cross-sectional view showing a surge absorber according to another embodiment of the present invention.

Next, another embodiment will be described with reference to FIG. 4.

The embodiment described herein is similar to the above embodiment in a basic configuration and is obtained by adding an additional element to the above-described embodiment. Accordingly, in FIG. 4, the same components as those shown in FIG. 1 will be denoted by the same reference numerals and their description will be omitted.

This embodiment is different from the above embodiment in that, while the cylindrical glass member 6 is interposed between the pair of main discharge surfaces 10A in the first embodiment, the inner wall of the barrel-shaped ceramics 8 is covered with a glass coating film (glass member) 21 in a surge absorber 20 according to the current embodiment.

The surge absorber 20 configured above has the same operation and effect as those of the surge absorber 1 according to the above embodiment.

Next, a further embodiment will be described with reference to FIG. 5.

Similar to the above embodiment, the embodiment described herein is similar to the other embodiments in a basic configuration. Accordingly, in FIG. 5, the same components as those shown in FIG. 1 will be denoted by the same reference numerals and their description will be omitted.

The above embodiment is different from the previous embodiments in that, while the cylindrical glass member 6 is interposed between the pair of main discharge surfaces 10A in the embodiment, granular glass members 106 containing silicon oxide ($SiO_2$) are charged in a discharge space formed by the main discharge electrode members 5 and the barrel-shaped ceramics 8 from one to the other of the pair of main discharge electrode members 5 in a surge absorber 30 according to this embodiment.

The surge absorber 30 configured above has the same operation and effect as those of the above-described surge absorber 1 according to the initial embodiment. In addition, since the granular glass members 106 are charged in the barrel-shaped ceramics 8, it is possible to realize the surge absorber having a high discharge start voltage.

Next, an embodiment will be described with reference to FIG. 6.

Similar to the previous embodiments, the embodiment described herein is similar to the initial embodiment in a basic configuration. Accordingly, in FIG. 6, the same components as those shown in FIG. 1 will be denoted by the same reference numerals and their description will be omitted.

The embodiment is different from the initial embodiment, in that, while the cylindrical glass member 6 is interposed between the pair of main discharge surfaces 10A in the first embodiment, a glass coating film (glass member) 11 containing silicon oxide ($SiO_2$) are coated on the surface of the main discharge surface 10A by printing and sintering a glass paste in a surge absorber 40 according to the embodiment. As a method of applying the glass coating film, a physical vapor deposition (PVD) method or a printing and sintering method is used.

According to the surge absorber 40 configured above, since the main discharge surface 10A is covered with the glass coating film 11 and the oxide film 10B which is chemically (thermodynamically) stable in a high-temperature region, it is possible to suppress the metallic component of the main discharge surface 10A from being scattered to be adhered to the discharge gap 2 or the inner wall of the barrel-shaped ceramics 8. Further, even when the glass coating film 11 and the oxide film 10B are damaged upon the main discharge, since the glass coating film 11 of the other portion, which is heated and molten, functions as a covering agent, the damaged portion is covered. Furthermore, since the glass coating film 11 functions as an oxidizing agent, the main discharge surface 10A is covered with an oxide layer formed of a metallic component of the main discharge surface 10A. Thus, the metallic component of the main discharge surface 10A is suppressed from being scattered. Accordingly, the long life span of the surge absorber can be realized.

Similar to the initial embodiment, since expensive metal which has excellent chemical stability in a high-temperature region need not be used as the main discharge electrode member 5, it is possible to use a cheap metal material in the main discharge electrode member 5 in the present invention.

Next, a further embodiment will be described with reference to FIG. 7.

The embodiment described herein is similar to the embodiment of FIG. 1 in a basic configuration and is obtained by adding an additional element to the above-described embodiment. Accordingly, in FIG. 7, the same components as those shown in FIG. 1 will be denoted by the same reference numerals and their description will be omitted.

This embodiment is different from the embodiment of FIG. 1 in that, while the columnar ceramics 4 is supported by the protruded supporting portion 10 of the main discharge electrode member 5 in the first embodiment, a main discharge electrode member 31 has a terminal electrode member 32, which corresponds to the main discharge electrode member 5 of the first embodiment, and a cap electrode 33 and the columnar ceramics 4 is supported by a protruded supporting portion 34 provided on the terminal electrode member 32 through the cap electrode 33 in a surge absorber 50 according to this embodiment.

A pair of cap electrodes 33 is formed of metal such as stainless which has hardness lower than that of the columnar ceramics 4 and can be plastic-deformed and the outer circumferences thereof extend to an axially inner portion than the front end of the protruded supporting portion 34 of the terminal electrode member 32 to have a substantially U shape in cross section, thereby forming main discharge surfaces 33A.

The surfaces of the pair of cap electrodes 33 are subjected to an oxidation treatment at 700° C. for 40 minutes in a controlled reduction atmosphere with a predetermined oxygen concentration to form an oxide film 33B having a thickness of 0.6 μm.

Next, a method of manufacturing the surge absorber 50 according to the present embodiment configured above will be described.

First, the pair of terminal electrode members 32 is annealed and integrally formed by a punching process.

The surfaces of the pair of cap electrodes 33 are subjected to an oxidation treatment at 700° C. for 40 minutes in a controlled reduction atmosphere with the predetermined oxygen concentration to form the oxide film 33B.

Thereafter, the pair of cap electrodes 33 is engaged with the both ends of the columnar ceramics 4 and the surge absorber 50 is manufactured by the same method as that of the embodiment of FIG. 1.

The surge absorber 50 configured above has the same operation and effect as those of the surge absorber 1 according to the initial embodiment. In addition, since the cap electrode 33 having the hardness lower than that of the columnar ceramics 4 is in close contact with the both surfaces of the columnar ceramics 4 and the protruded supporting portion 34, a good contact surface is obtained. Accordingly, sufficient ohmic contact can be obtained and an electrical property such as the discharge start voltage of the surge absorber 50 becomes stable.

Figure 8:
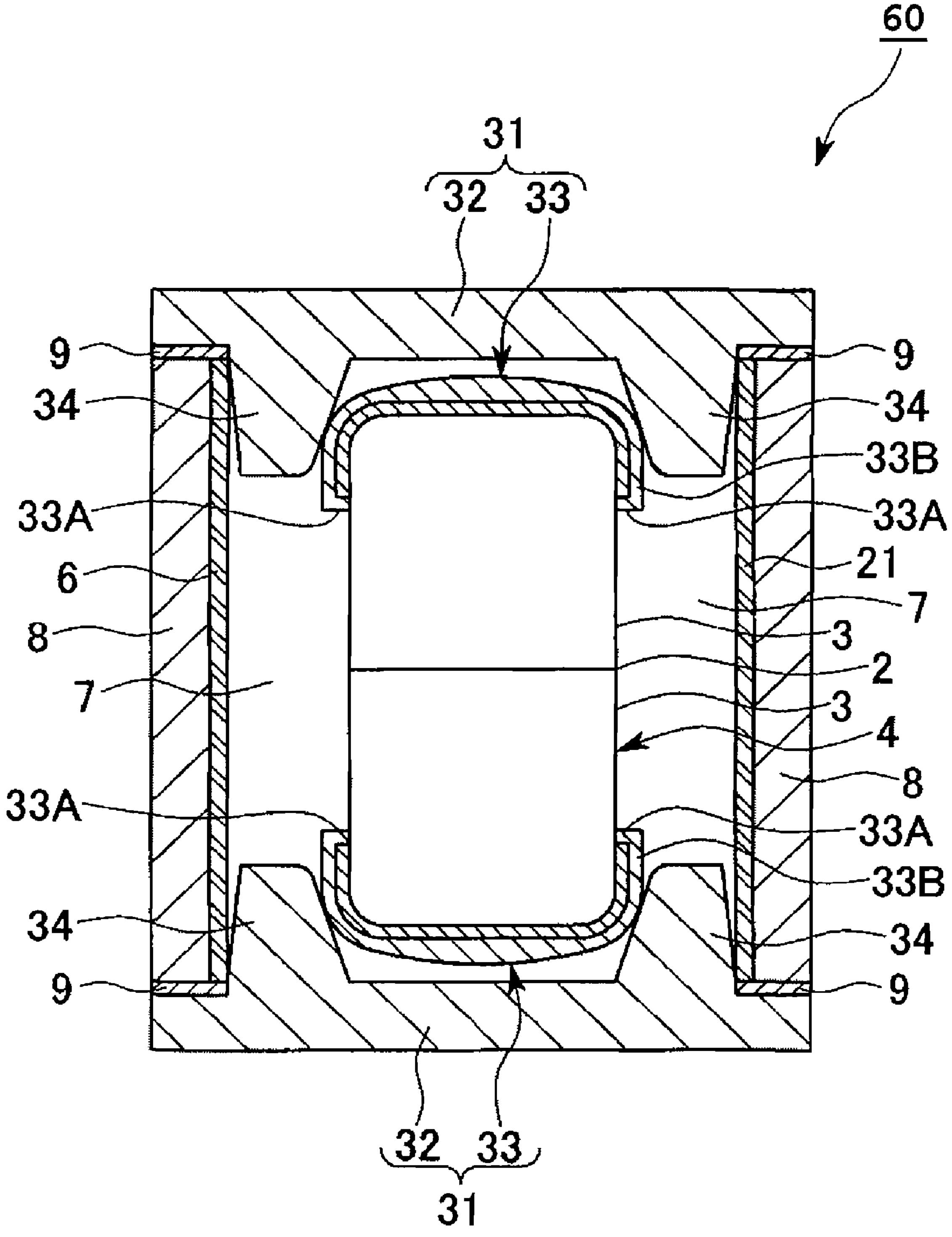
FIG. 8 is a cross-sectional view showing a surge absorber according to a first modified example of the embodiment of FIG. 7 of the present invention.

In a first modified example of the present embodiment, similar to an above embodiment, as shown in FIG. 8, there is provided a surge absorber 60 in which a glass coating film 21 covering the inner wall of the barrel-shaped ceramics 8 is formed. By such a configuration, the same effect as that described above can be obtained.

Figure 9:
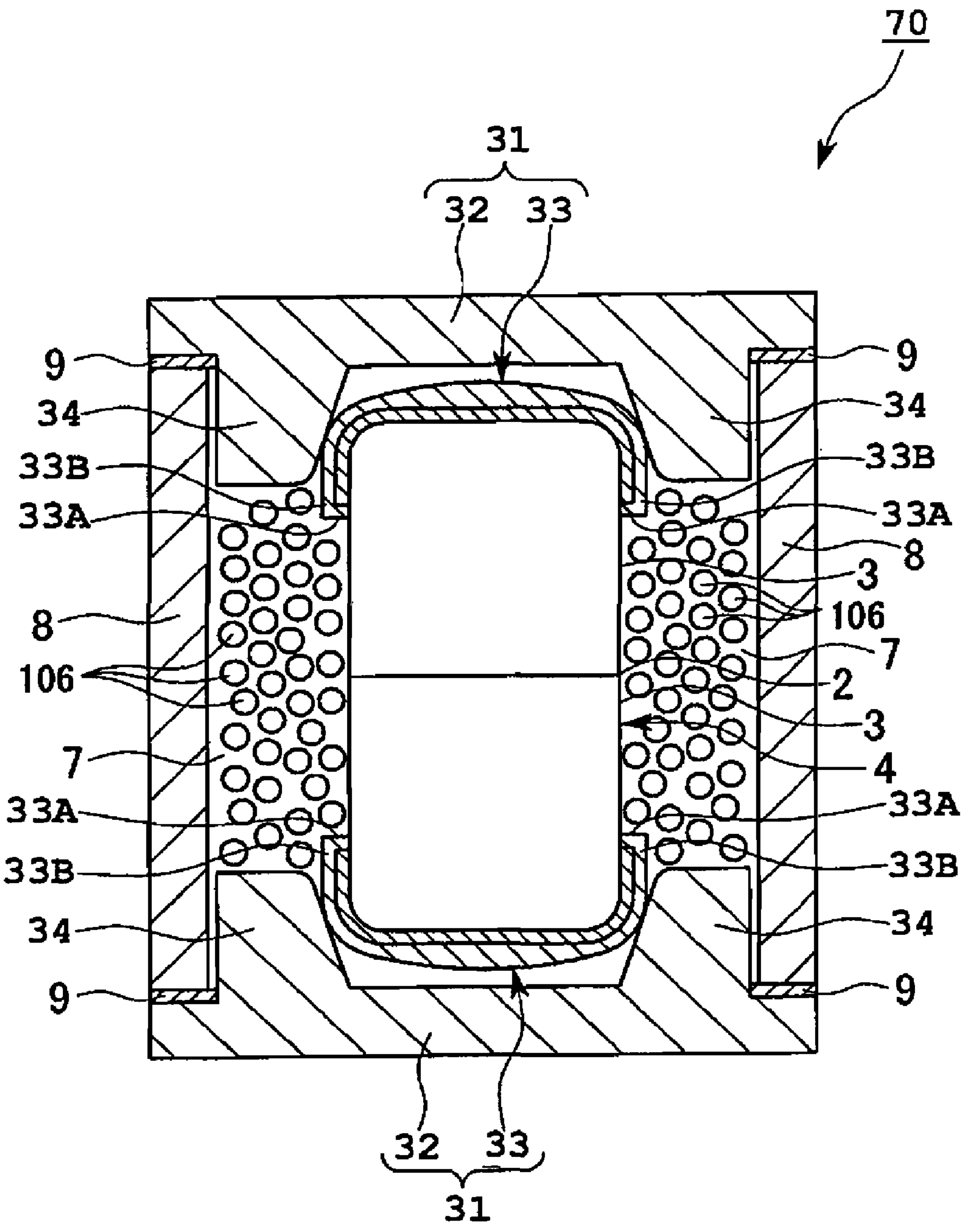
FIG. 9 is a cross-sectional view showing a surge absorber according to a second modified example of the embodiment of FIG. 7 of the present invention.

In a second modified example of the present embodiment, similar to another embodiment, as shown in FIG. 9, there is provided a surge absorber 70 in which granular glass members 106 are charged in the barrel-shaped ceramics 8. By such a configuration, the same effect as that described above can be obtained.

Figure 10:
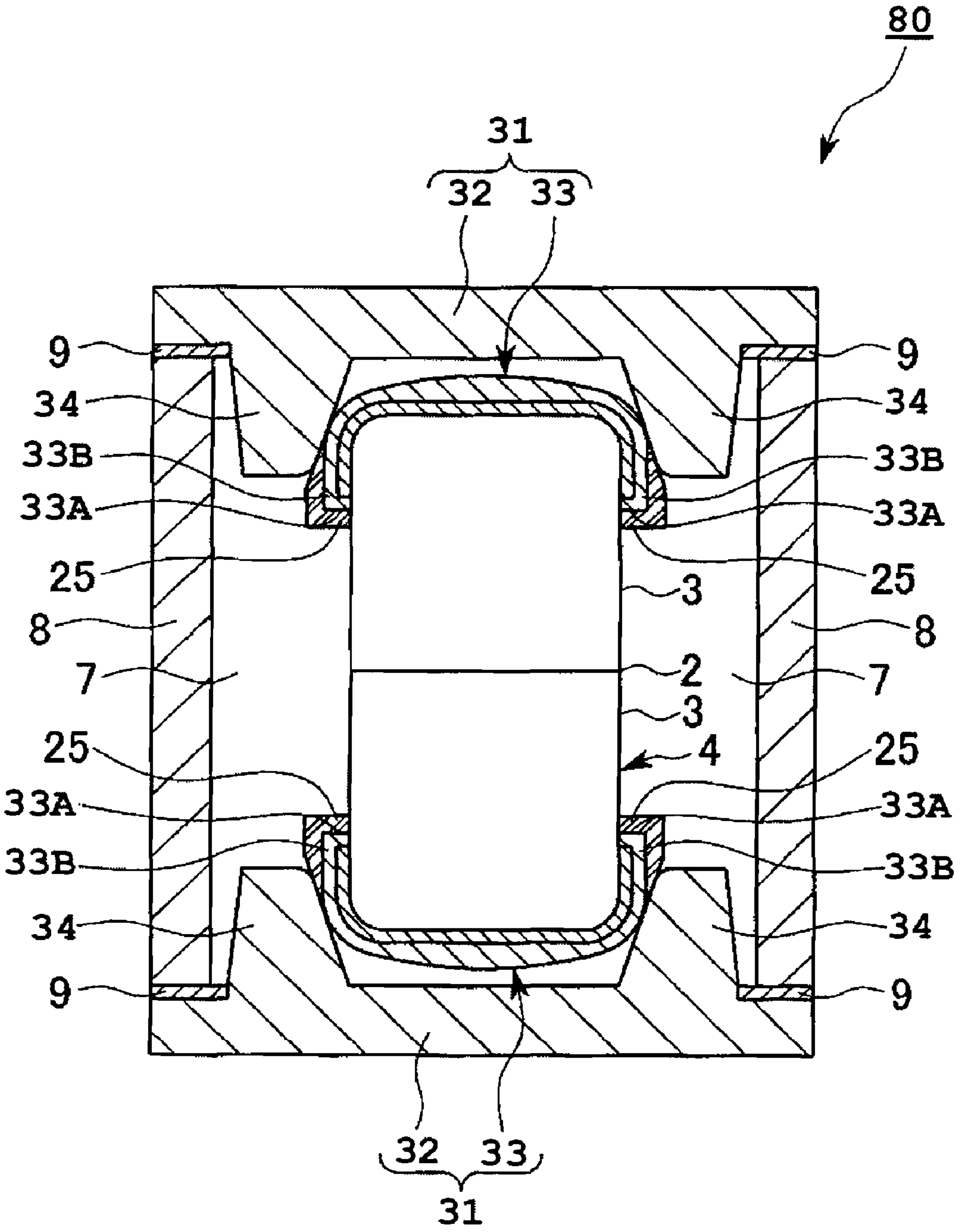
FIG. 10 is a cross-sectional view showing a surge absorber according to a third modified example of the embodiment of FIG. 7 of the present invention.

In a third modified example of the present embodiment, similar to a further above embodiment, as shown in FIG. 10, there is provided a surge absorber 80 in which a glass coating film 25 is coated on the surface of the main discharge surface 33A by a physical vapor deposition (PVD) method. By such a configuration, the same effect as that described above can be obtained.

Next, an embodiment will be described with reference to FIG. 11.

The embodiment described herein is similar to the embodiment of FIG. 1 in a basic configuration and is obtained by adding an additional element to the above-described embodiment. Accordingly, in FIG. 11, the same components as those shown in FIG. 1 will be denoted by the same reference numerals and their description will be omitted.

Figure 11A:
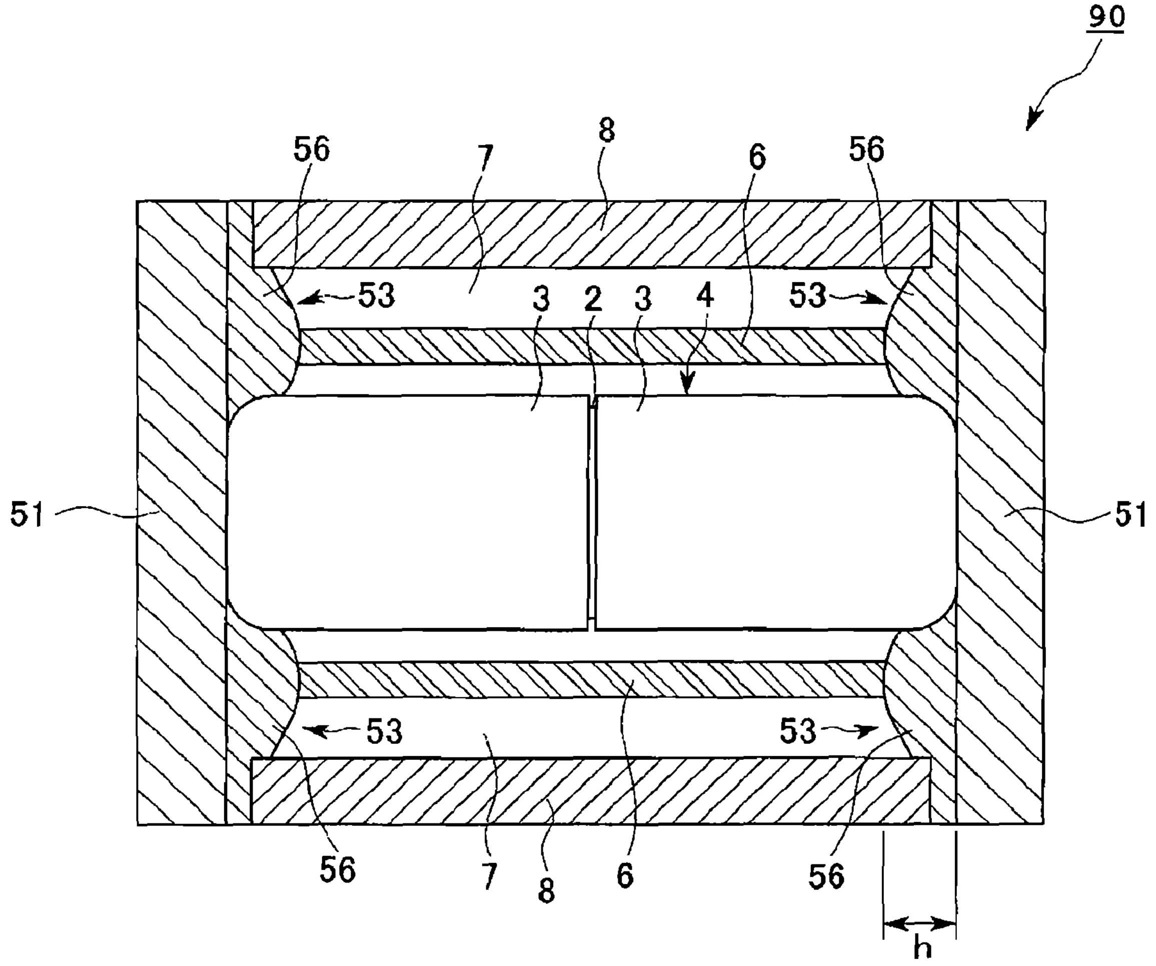
FIG. 11 is a view showing a surge absorber according to a further embodiment of the present invention, wherein FIG. 11(*a*) is a cross-sectional view thereof and FIG. 11(*b*) is an enlarged view of a contact portion between a main discharge electrode member and a columnar ceramics.
Figure 11B:
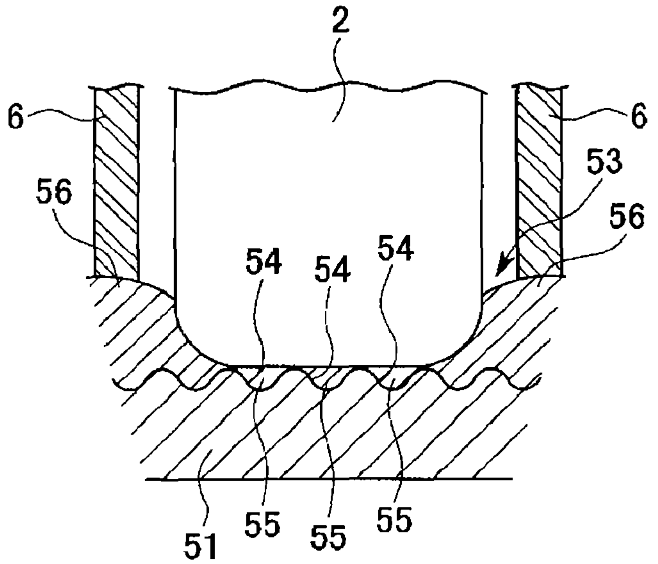

The embodiment is different from the initial embodiment in that, while the main discharge electrode member 5 has the protruded supporting portion 10 formed integrally in the first embodiment, a main discharge electrode member 51, as shown in FIG. 11(*a*), has a flat plate shape in a surge absorber 90 according to the embodiment.

A brazing material 53 is coated on the facing internal surfaces of the pair of main discharge electrode members 51.

As shown in FIG. 11(*b*), the brazing material 53 includes a charging portion 55 which fills gaps 54 formed in the contact surface between the pair of main discharge electrode members 51 and the columnar ceramics 4, and a holding portion 56 which holds the outer circumferential surface of the columnar ceramics 4 at the both ends of the columnar ceramics 4. The gaps 54 are formed between the pair of main discharge electrode members 51 and the columnar ceramics 4 by irregularities formed due to dimensional accuracy, flaw or deformation upon machining.

When the main discharge electrode member 51 and the columnar ceramics 4 are brought into contact with each other, the brazing material 53 rises to cover the outer circumferential surface of the columnar ceramics 4 and thus holding portion 56 is formed.

The height h of the risen holding portion 56 is a dimension from the end surface to an uppermost part of the main discharge electrode member 51 and is defined by a predetermined life span property, because the uppermost part becomes the main discharge portion.

Next, a method of manufacturing the surge absorber 90 according to the present embodiment configured above will be described.

First, an amount of brazing material 53 which is sufficient to form the holding portion 56 is coated on a surface of the main discharge electrode member 51 and the columnar ceramics 4 is mounted on the central region of the main discharge electrode member 51 such that the main discharge electrode member 51 and the columnar ceramics 4 are brought into contact with each other. Next, the cylindrical glass member 6 is mounted and the end surface of the barrel-shaped ceramics 8 is mounted.

Then, the other main discharge electrode member 51 coated with the brazing material 53 is mounted on the other end surface of the barrel-shaped ceramics 8, thereby forming a temporary assembly state.

Subsequently, a sealing process will be described. As described above, when the device which is in the temporary assembly state is heated in the sealing gas atmosphere, the brazing material 53 is molten and the main discharge electrode member 51 and the columnar ceramics 4 are brought into close contact with each other. At this time, the charging portion 55 of the brazing material 53 fills the gaps 54 between the columnar ceramics 4 and the main discharge electrode member 51 by melting. In addition, the holding portion 56 formed by surface tension of the brazing material 53 buries and holds the both ends of the columnar ceramics 4.

Thereafter, similar to the initial embodiment, a cooling process is performed to manufacture the surge absorber 90.

The surge absorber 90 has the same operation and effect as those of the surge absorber 1 according to the initial embodiment. In addition, since the gaps 54 which are formed in the contact surface between the main discharge electrode member 51 and the columnar ceramics 4 by the dimensional accuracy, the flaw and the deformation upon machining are filled with the brazing material 53, the contact area between the main discharge electrode member 51 and the columnar ceramics 4 increases. Accordingly, sufficient ohmic contact can be obtained and thus an electrical property such as the discharge start voltage of the surge absorber 90 becomes stable.

Figure 12A:
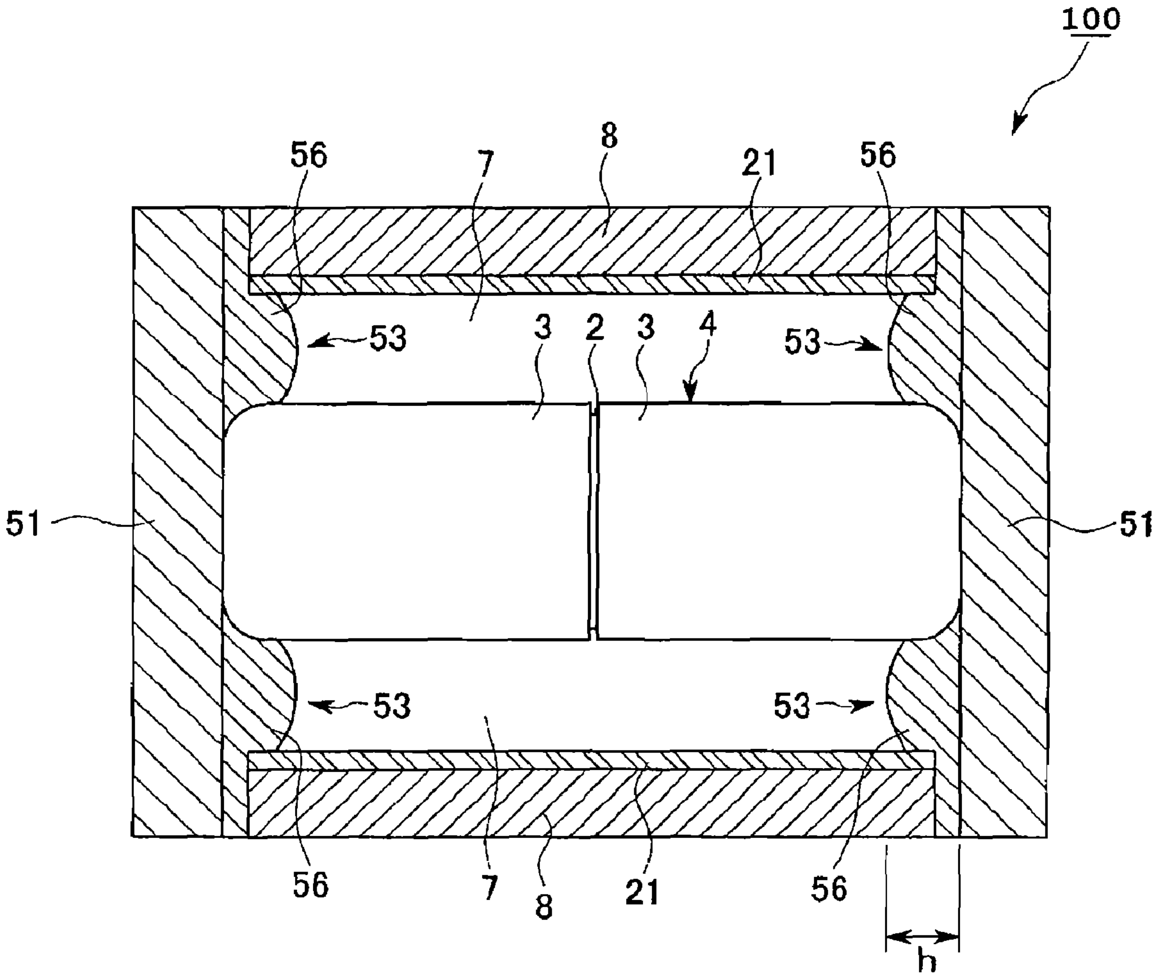
FIG. 12 is a view showing a surge absorber according to a first modified example of the embodiment of FIG. 11 of the present invention, wherein FIG. 12(*a*) is a cross-sectional view thereof and FIG. 12(*b*) is an enlarged view of a contact portion between a main discharge electrode member and a columnar ceramics.
Figure 12B:
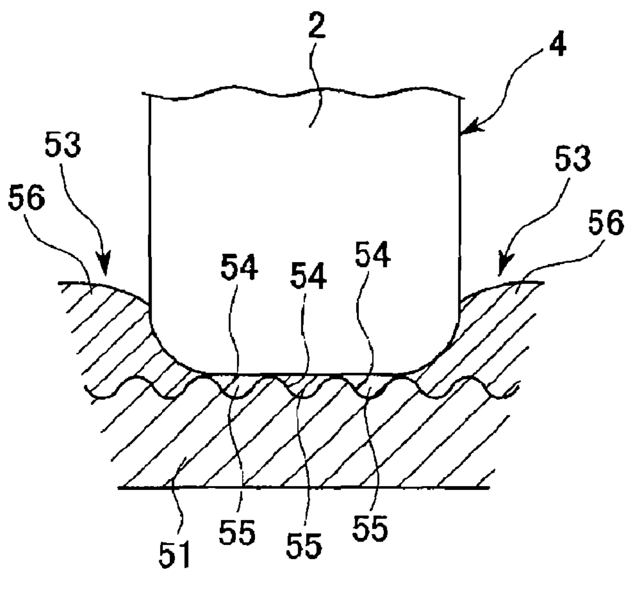

In a first modified example of the present embodiment, similar to the above embodiments, as shown in FIG. 12, there is provided a surge absorber 100 in which the glass coating film 21 which covers the inner wall of the barrel-shaped ceramics 8 is formed. By such a configuration, the same operation and effect as those described above can be obtained.

Figure 13A:
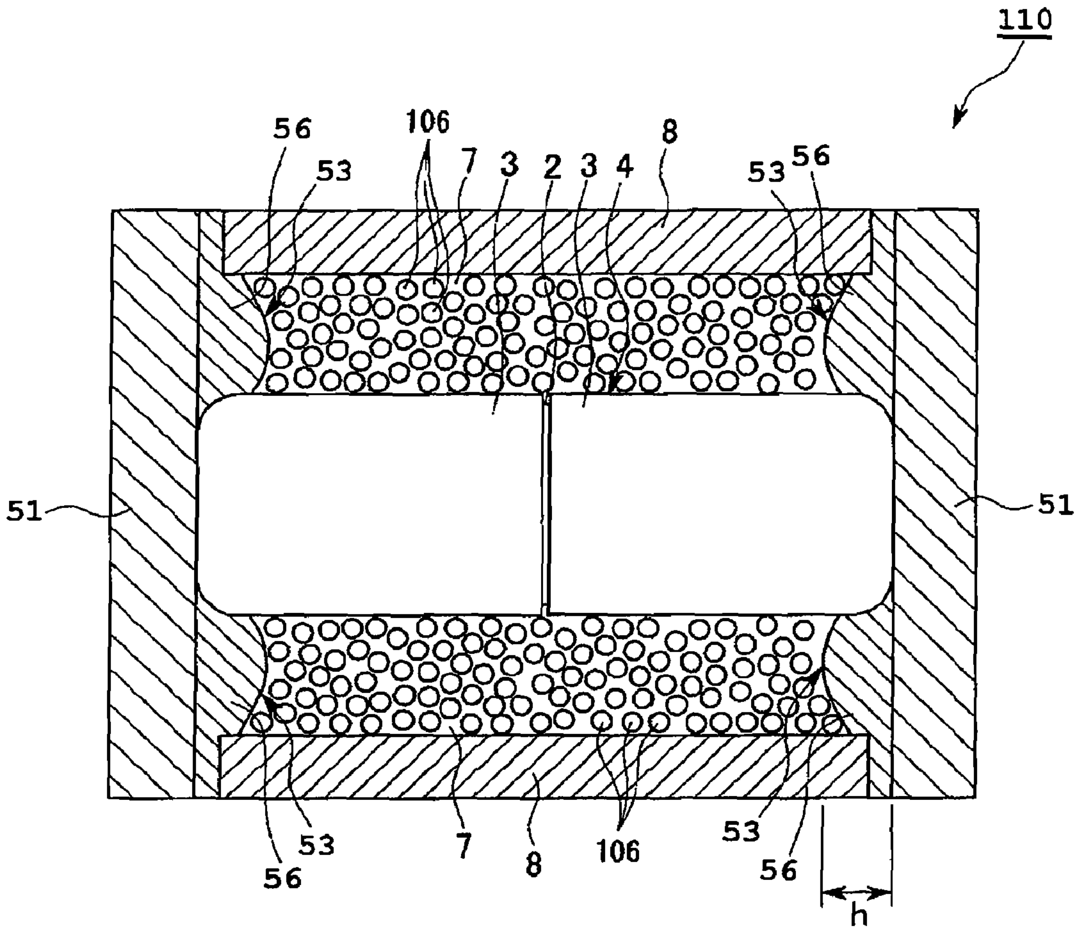
FIG. 13 is a view showing a surge absorber according to a second modified example of the embodiment of FIG. 11 the present invention, wherein FIG. 13(*a*) is a cross-sectional view thereof and FIG. 13(*b*) is an enlarged view of a contact portion between a terminal electrode member and a cap electrode.
Figure 13B:
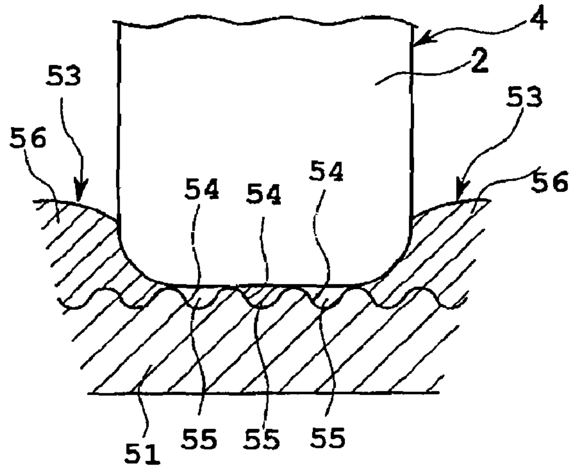

In a second modified example of the present embodiment, similar to another embodiment, as shown in FIG. 13, there is provided a surge absorber 110 in which granular glass members 106 are charged in the barrel-shaped ceramics 8. By such a configuration, the same operation and effect as those described above can be obtained.

Although the holding portion 56 and the charging portion 55 are formed of the same material as the brazing material 53 in the present embodiment, the charging portion 55 may be formed of a different material from the brazing material 53 and may be a conductive adhesive which can adhere the columnar ceramics 4 and the main discharge electrode member 51, such as an active silver braze. Accordingly, the columnar ceramics 4 and the main discharge electrode member 51 are adhered to each other and thus more sufficient ohmic contact between the main discharge electrode member 51 and the conductive coating film 3 can be obtained. Accordingly, an electrical property such as the discharge start voltage of the surge absorber 50 becomes stable.

Similar to the charging portion 55, the holding portion 56 may be also formed of a different material from the brazing material 53 and may use a glass material which is hard to be wet by the active silver braze or the brazing material 53. Accordingly, the columnar ceramics 4 is fixed to the vicinity of the center of the main discharge electrode member 51 and the peripheral portion thereof with more certainty.

Next, an embodiment will be described with reference to FIG. 14.

The embodiment described herein is similar to the embodiment of FIG. 12 in a basic configuration and is obtained by adding an additional element to the above-described embodiment. Accordingly, in FIG. 14, the same components as those shown in FIG. 11 will be denoted by the same reference numerals and their description will be omitted.

Figure 14A:
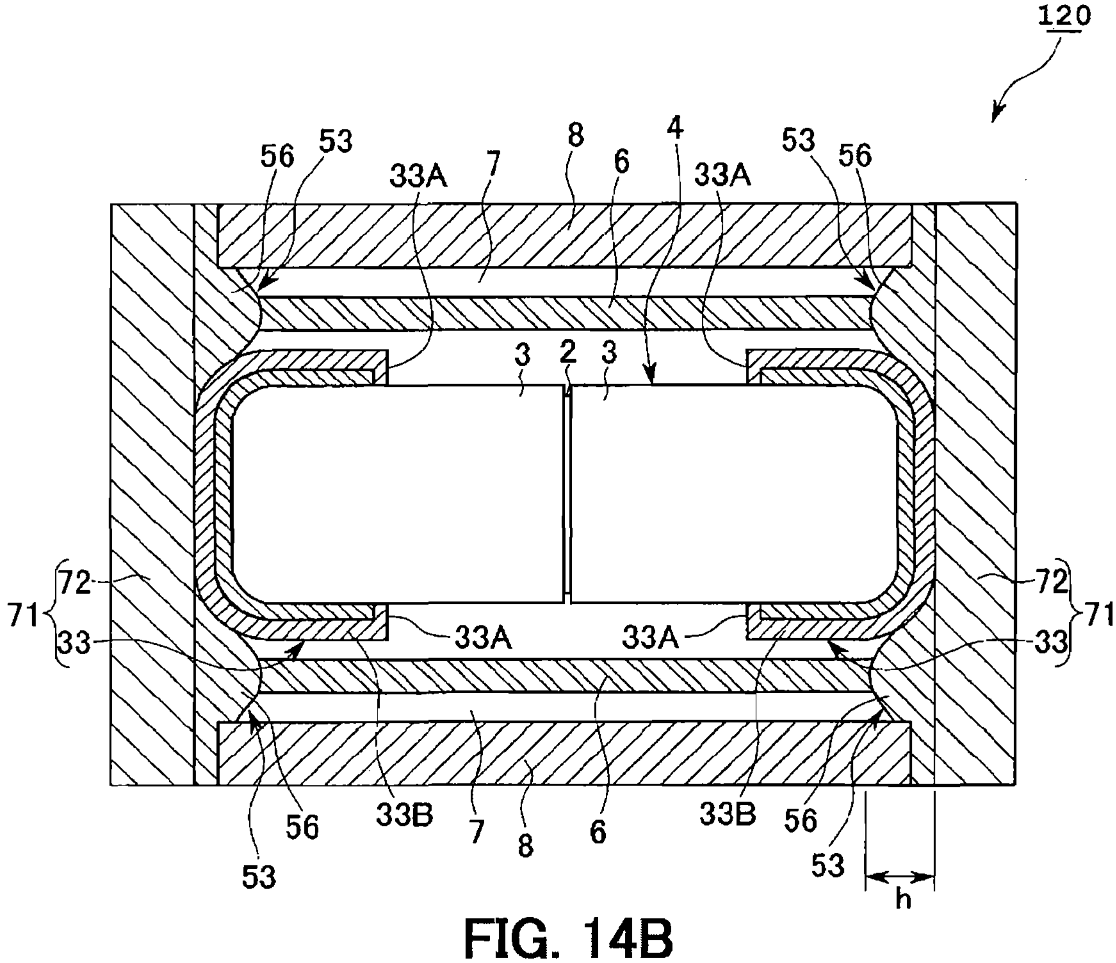
FIG. 14 is a view showing a surge absorber according to a an embodiment of FIG. 14 of the present invention, wherein FIG. 14(*a*) is a cross-sectional view thereof and FIG. 14(*b*) is an enlarged view of a contact portion between a terminal electrode member and a cap electrode.
Figure 14B:
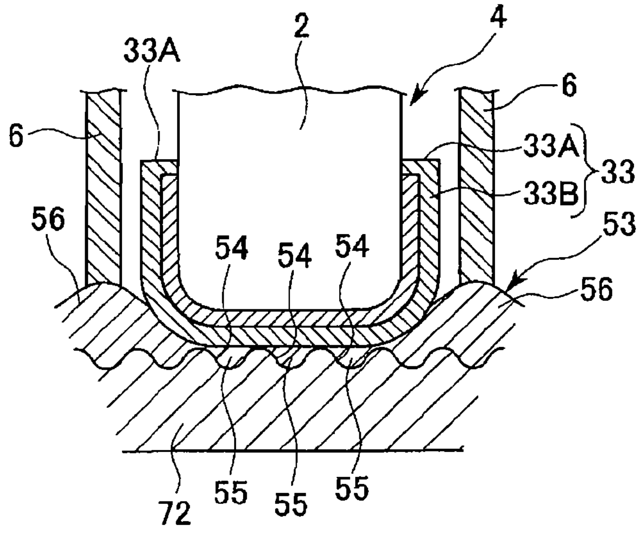

The embodiment is different from the embodiment of FIG. 12 in that, while only the flat-plate-shaped main discharge electrode member 51 is configured in the embodiment, a main discharge electrode member 71, as shown in FIG. 14(*a*), includes a flat-plate-shaped terminal electrode member 71 and a cap electrode 33 in a surge absorber 120 according to this embodiment.

As shown in FIG. 14(*b*), the brazing material 53 includes the charging portion 55 which fills the gaps 54 formed in the contact surface between a pair of terminal electrode members 72 and the cap electrode 33 and the holding portion 56 which holds the outer circumferential surface of the cap electrode 33 at the both ends of the cap electrode 33.

The height h of the holding portion 56 is lower than that of the cap electrode 33. Accordingly, the facing surfaces of the cap electrodes 33 become the main discharge surfaces 33A.

Next, a method of manufacturing the surge absorber 120 according to the present embodiment configured above will be described.

First, similar to an above embodiment, the oxide films 33B are formed on the surfaces of the pair of cap electrodes 33 and the pair of cap electrodes is engaged with the both ends of the columnar ceramics 4.

Thereafter, the pair of cap electrodes 33 is engaged with the both ends of the columnar ceramics 4 and the surge absorber 120 is manufactured by the same method as that of the above embodiment.

The surge absorber 120 has the same operation and effect as those of the surge absorber 90 according to the embodiment of FIG. 12.

Figure 15A:
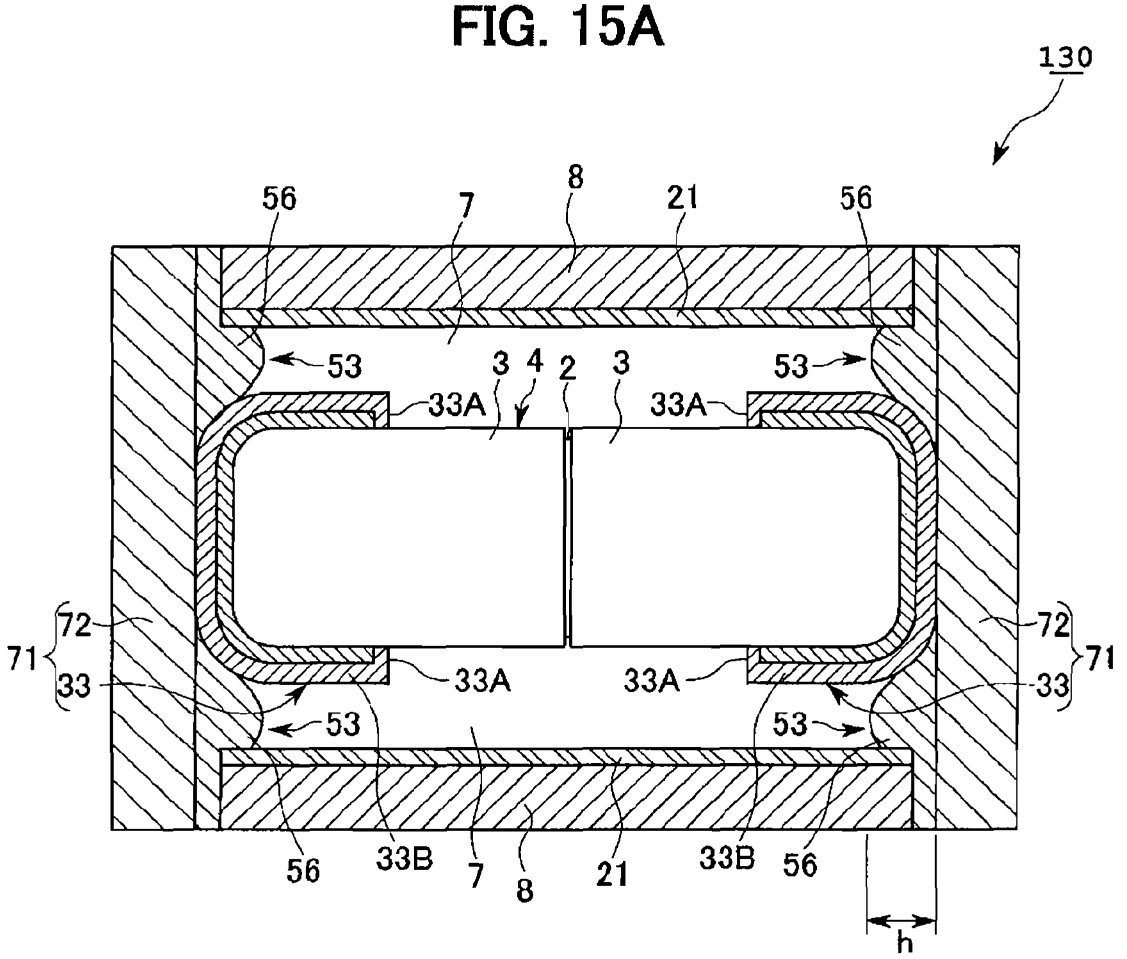
FIG. 15 is a view showing a surge absorber according to a first modified example of the embodiment of FIG. 14 of the present invention, wherein FIG. 15(*a*) is a cross-sectional view thereof and FIG. 15(*b*) is an enlarged view of a contact portion between a terminal electrode member and a cap electrode.
Figure 15B:
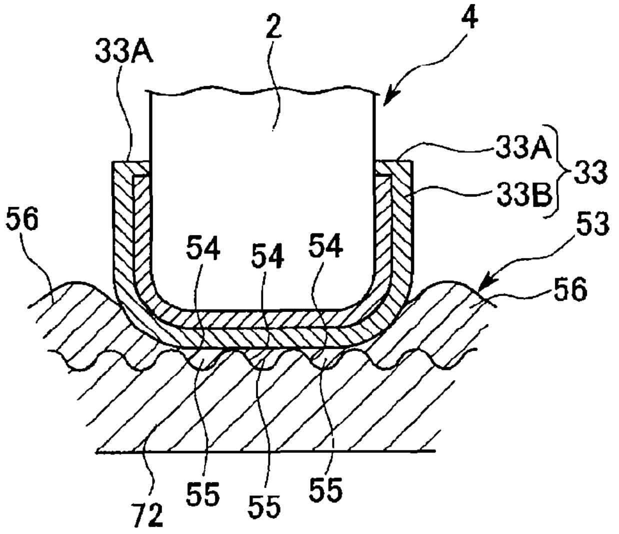

In a first modified example of the present embodiment, similar to the above embodiment, as shown in FIG. 15, there is provided a surge absorber 130 in which the glass coating film 21 which covers the inner wall of the barrel-shaped ceramics 8 is formed. By such a configuration, the same operation and effect as those described above can be obtained.

Figure 16A:
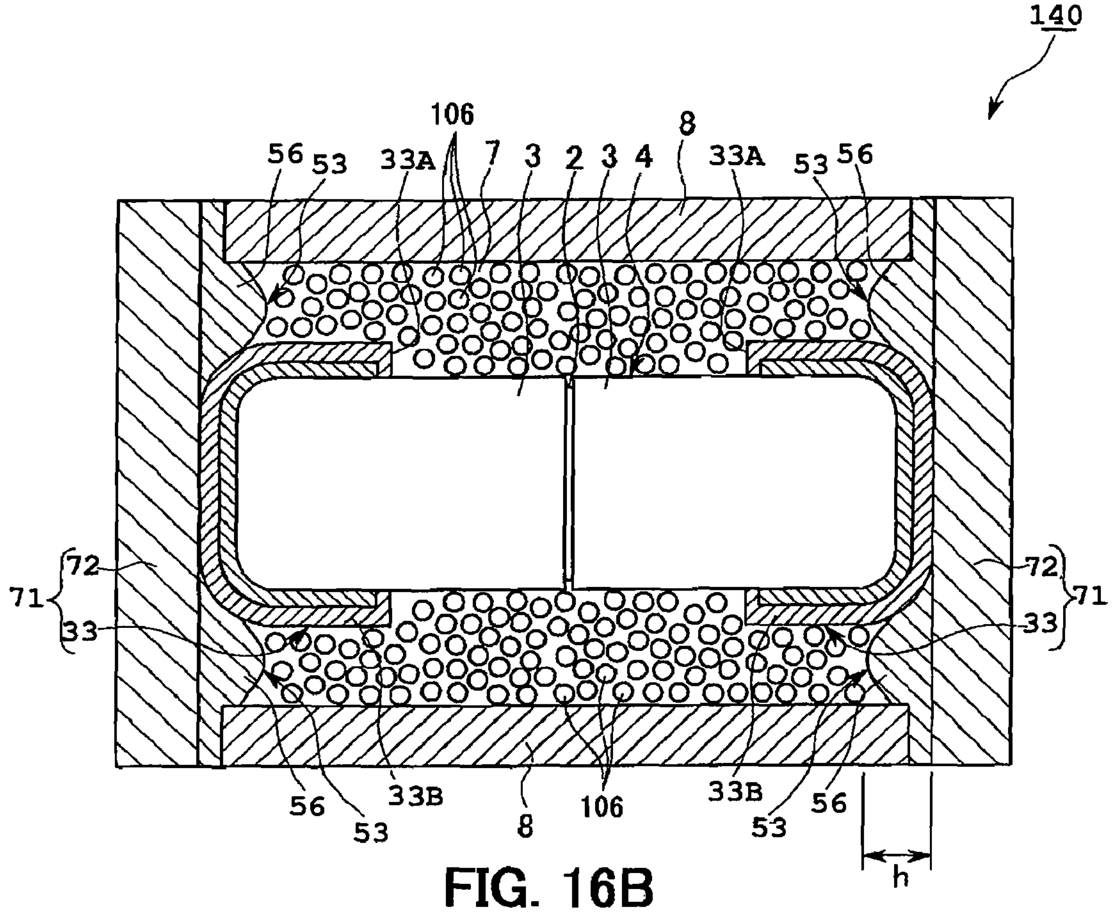
FIG. 16 is a view showing a surge absorber according to a second modified example of the embodiment of FIG. 14 of the present invention, wherein FIG. 16(*a*) is a cross-sectional view thereof and FIG. 16(*b*) is an enlarged view of a contact portion between a terminal electrode member and a cap electrode.
Figure 16B:
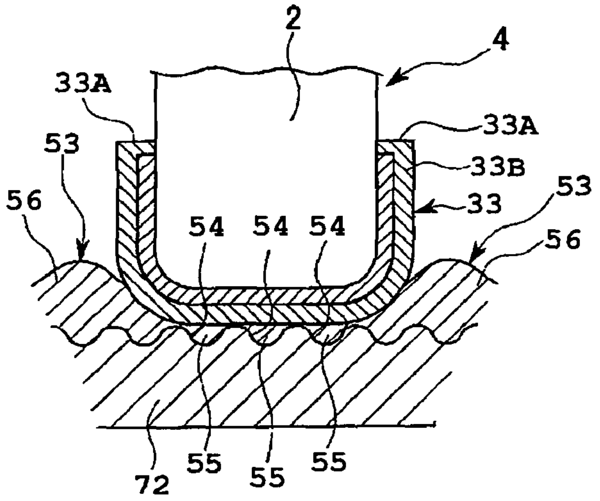

In a second modified example of the present embodiment, similar to the above embodiment, as shown in FIG. 16, there is provided a surge absorber 140 in which granular glass members 106 are charged in the barrel-shaped ceramics 8. By such a configuration, the same operation and effect as those described above can be obtained.

Similar to the sixth embodiment, the charging portion 55 may be formed of a different material from the brazing material 53 and may be a conductive adhesive which can adhere the oxide film 33B and the terminal electrode member 72, such as an active silver braze.

Similar to the charging portion 55, the holding portion 56 may be formed of a different material from the brazing material 53 and may use a glass material which is hard to be wet by the active silver braze or the brazing material 53.

A third modified example of the present embodiment will be described with reference to FIG. 17.

The embodiment described herein is similar to the third modified example above in a basic configuration and is obtained by adding an additional element to the third modified example of the above embodiment. Accordingly, in FIG. 17, the same components as those shown in FIG. 10 will be denoted by the same reference numerals and their description will be omitted.

Figure 17A:
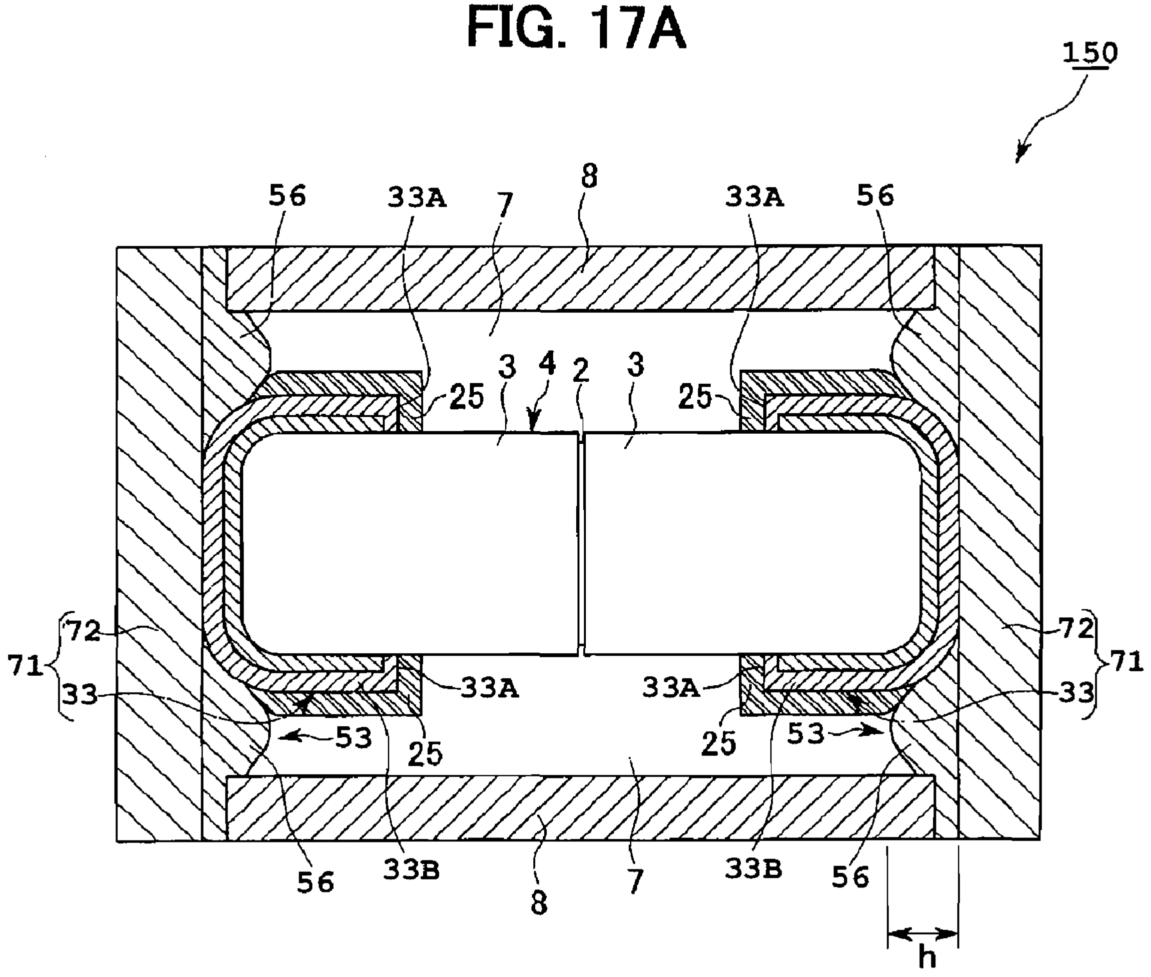
FIG. 17 is a view showing a surge absorber according to a third modified example of the embodiment of FIG. 14 of the present invention, wherein FIG. 17(*a*) is a cross-sectional view thereof and FIG. 17(*b*) is an enlarged view of a contact portion between a terminal electrode member and a cap electrode.
Figure 17B:
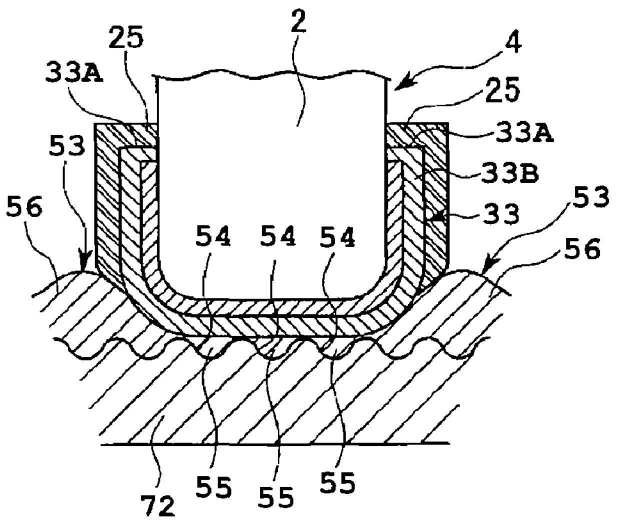

The third modified example of the present embodiment is different from the third modified example of the previous embodiment in that, while the terminal electrode member 32 has the protruded supporting portions 34 formed integrally in the third modified example of the fifth embodiment, the main discharge electrode member 71, as shown in FIG. 17(*a*), includes the flat-plate-shaped terminal electrode member 72 and the cap electrode 33 in a surge absorber 150 according to the third modified example of the present embodiment.

A brazing material 53 is coated on the facing internal surfaces of the pair of main discharge electrode members 72.

As shown in FIG. 17(*b*), the brazing material 53 includes the charging portion 55 which fills the gaps 54 formed in the contact surface between the pair of main discharge electrode members 72 and the cap electrode 33, and the holding portion 56 which holds the outer circumferential surface of the cap electrode 33 at the both ends of the cap electrode 33.

The height h of the holding portion 56 is lower than that of the cap electrode 33. Accordingly, the facing surfaces of the cap electrodes 33 become the main discharge surfaces 33A.

Next, a method of manufacturing the surge absorber 150 according to the present embodiment configured above will be described.

First, similar to another embodiment, the oxide films 33B are formed on the surfaces of the pair of cap electrodes 33 and the main discharge surface 33A is covered with the glass coating film 25 by a physical vapor deposition (PVD) method. The pair of cap electrodes is engaged with the both ends of the columnar ceramics 4.

Next, an amount of brazing material 53 which is sufficient to form the holding portion 56 is coated on a surface of the terminal electrode member 72 and the columnar ceramics 4 engaged with the cap electrodes 33 is mounted on the central region of the terminal electrode member 72 such that the terminal electrode member 72 and the cap electrodes 33 are brought into contact with each other. Next, the end surface of the barrel-shaped ceramics 8 is mounted.

Then, the other terminal electrode member 72 coated with the brazing material 53 is mounted on the other end surface of the barrel-shaped ceramics 8, thereby forming a temporary assembly state.

As described above, when the device which is in the temporary assembly state is sufficiently vacuumed and heated in the sealing gas atmosphere, the brazing material 53 is molten and the terminal electrode member 72 and the cap electrode 33 are brought into close contact with each other. At this time, the charging portion 55 of the brazing material 53 fills the gaps 54 between the cap electrode 33 and the terminal electrode member 72 by melting. In addition, the holding portion 56 formed by surface tension of the brazing material 53 buries and holds the both ends of the cap electrode 33.

Thereafter, similar to the initial embodiment, a cooling process is performed to manufacture the surge absorber 150.

Figure 6:
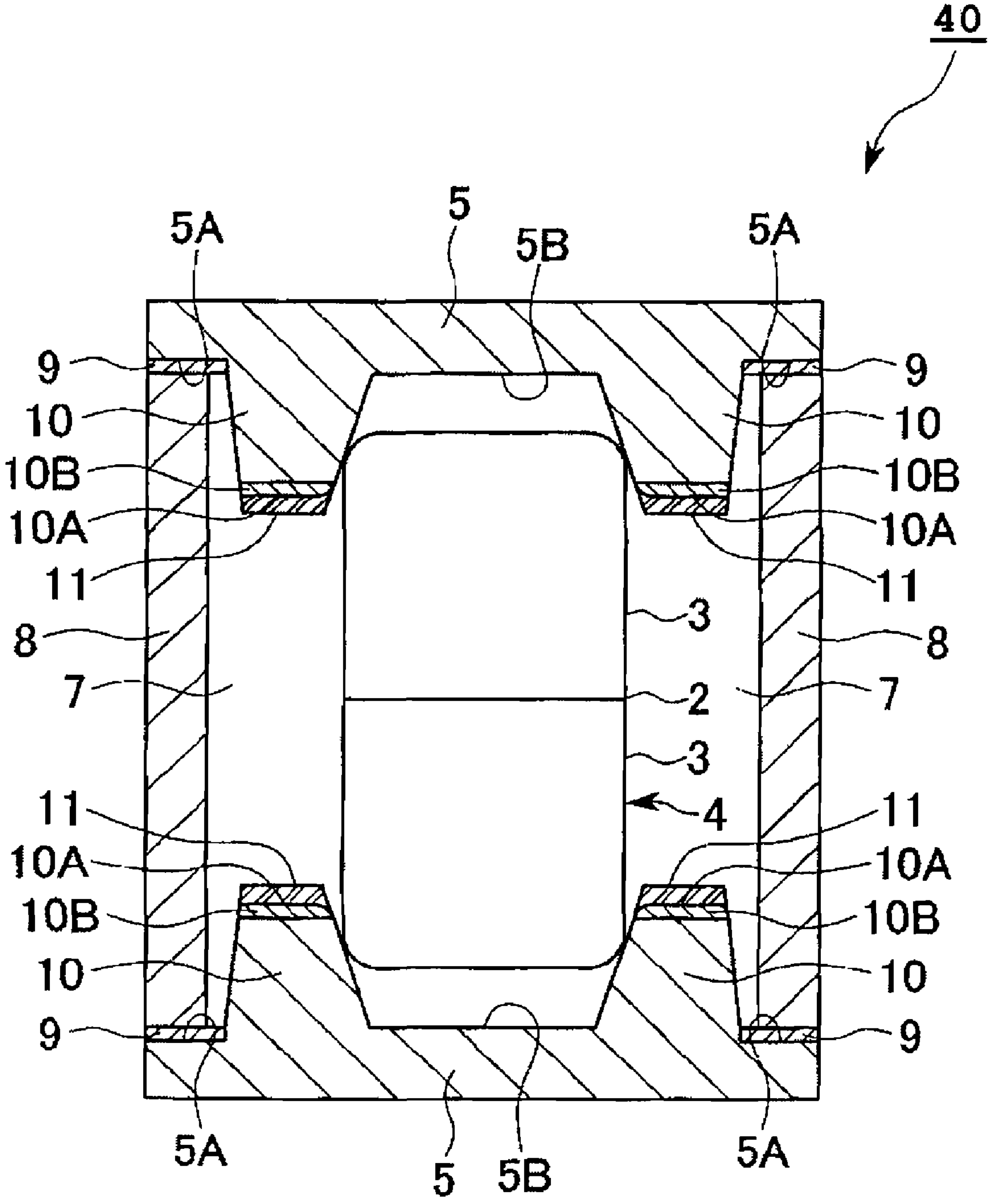
FIG. 6 is a cross-sectional view showing a surge absorber according to an embodiment of the present invention.

The surge absorber 150 has the same operation and effect as those of the surge absorber 40 according to the embodiment of FIG. 6. In addition, since the gaps 54 which are formed in the contact surface between the terminal electrode member 72 and the cap electrode 33 by the dimensional accuracy, the flaw and the deformation upon machining are filled with the brazing material 53, the contact area between the terminal electrode member 72 and the cap electrode 33 increases. Accordingly, sufficient ohmic contact can be obtained and thus an electrical property such as the discharge start voltage of the surge absorber 150 becomes stable.

Although the holding portion 56 and the charging portion 55 are formed of the same material as the brazing material 53 in the present embodiment, the charging portion 55 may be formed of a different material from the brazing material 53 and may be a conductive adhesive which can adhere the oxide film 33B and the terminal electrode member 72, such as an active silver braze. By this configuration, the cap electrode 33 and the terminal electrode member 72 are adhered to each other and thus more sufficient ohmic contact between the main discharge electrode member 71 and the conductive coating film 3 can be obtained.

Similar to the charging portion 55, the holding portion 56 may be also formed of a different material from the brazing material 53 and may use a glass material which is hard to be wet by the active silver braze or the brazing material 53. Accordingly, the columnar ceramics 4 is fixed to the vicinity of the center of the terminal electrode member 72 and the peripheral portion thereof with more certainty.

Figure 18:
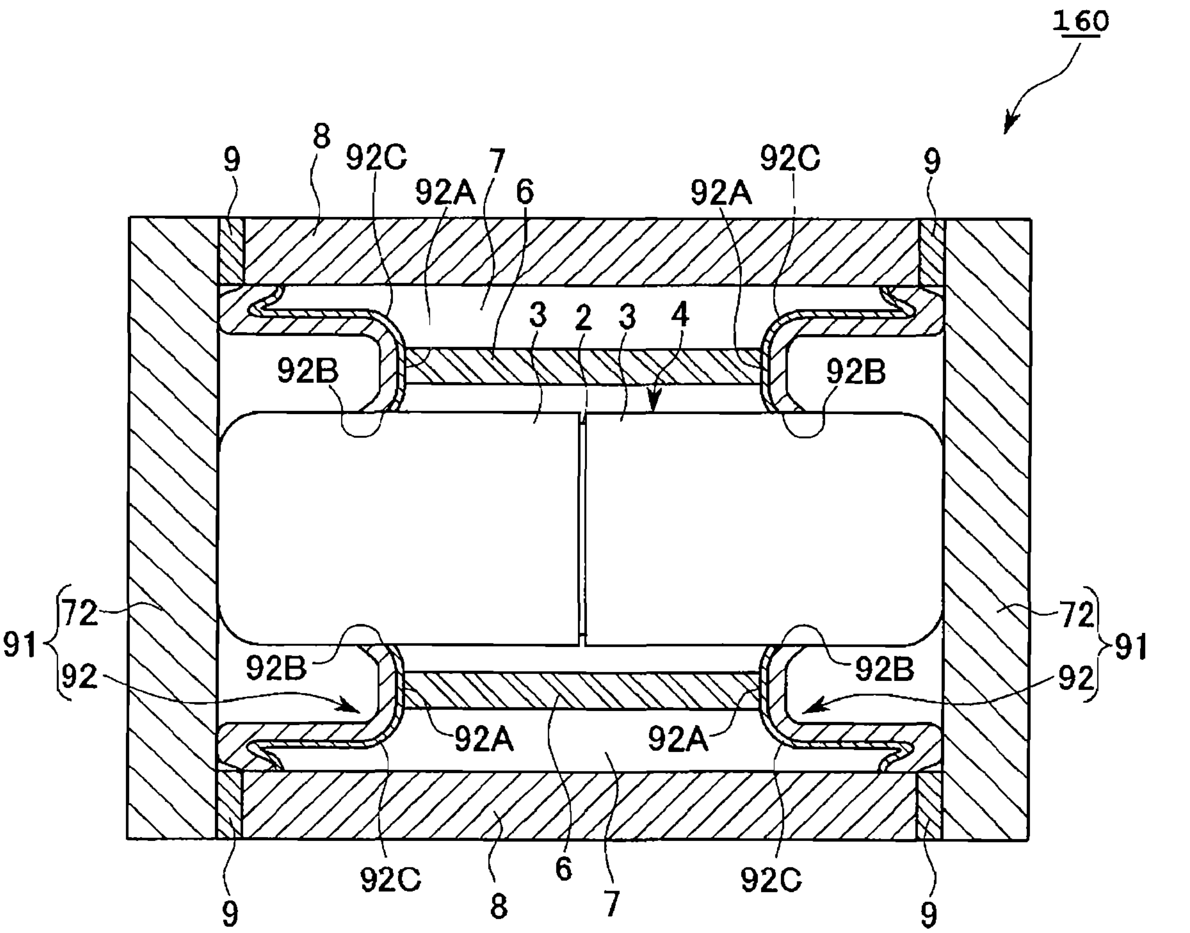
FIG. 18 is a cross-sectional view showing a surge absorber according to an embodiment of the present invention.

Next, an embodiment will be described with reference to FIG. 18.

The embodiment described herein is similar to the initial embodiment in a basic configuration and is obtained by adding an additional element to that embodiment. Accordingly, in FIG. 18, the same components as those shown in FIG. 1 will be denoted by the same reference numerals and their description will be omitted.

This embodiment is different from the initial embodiment in that, while the main discharge electrode member 5 has the protruded supporting portions 10 formed integrally and the columnar ceramics 4 is pressed and fitted into the protruded supporting portions 10 in the initial embodiment, a main discharge electrode member 91 includes the terminal electrode member 72 and a protruded supporting member 92 in a surge absorber 160 according to the current embodiment.

The protruded supporting member 92 has a bottom and has a cylindrical shape, and an opening 92B is formed in the center of the bottom 92A. The diameter of the opening 92B is slightly smaller than that of the columnar ceramics 4. When the columnar ceramics 4 is inserted into the opening 92B and the bottom 92A is elastically bent axially outward, good ohmic contact between the protruded supporting member 92 and the conductive coating film 3 is obtained.

The surface of a pair of protruded supporting members 92 are subjected to an oxidation treatment, similar to the initial embodiment, to form an oxide film 92C having a thickness of 0.6 μm. The bottoms 92A which are facing surfaces become the main discharge surfaces.

This surge absorber 160 has the same operation and effect as those of the surge absorber 1 according to the initial embodiment.

Figure 19:
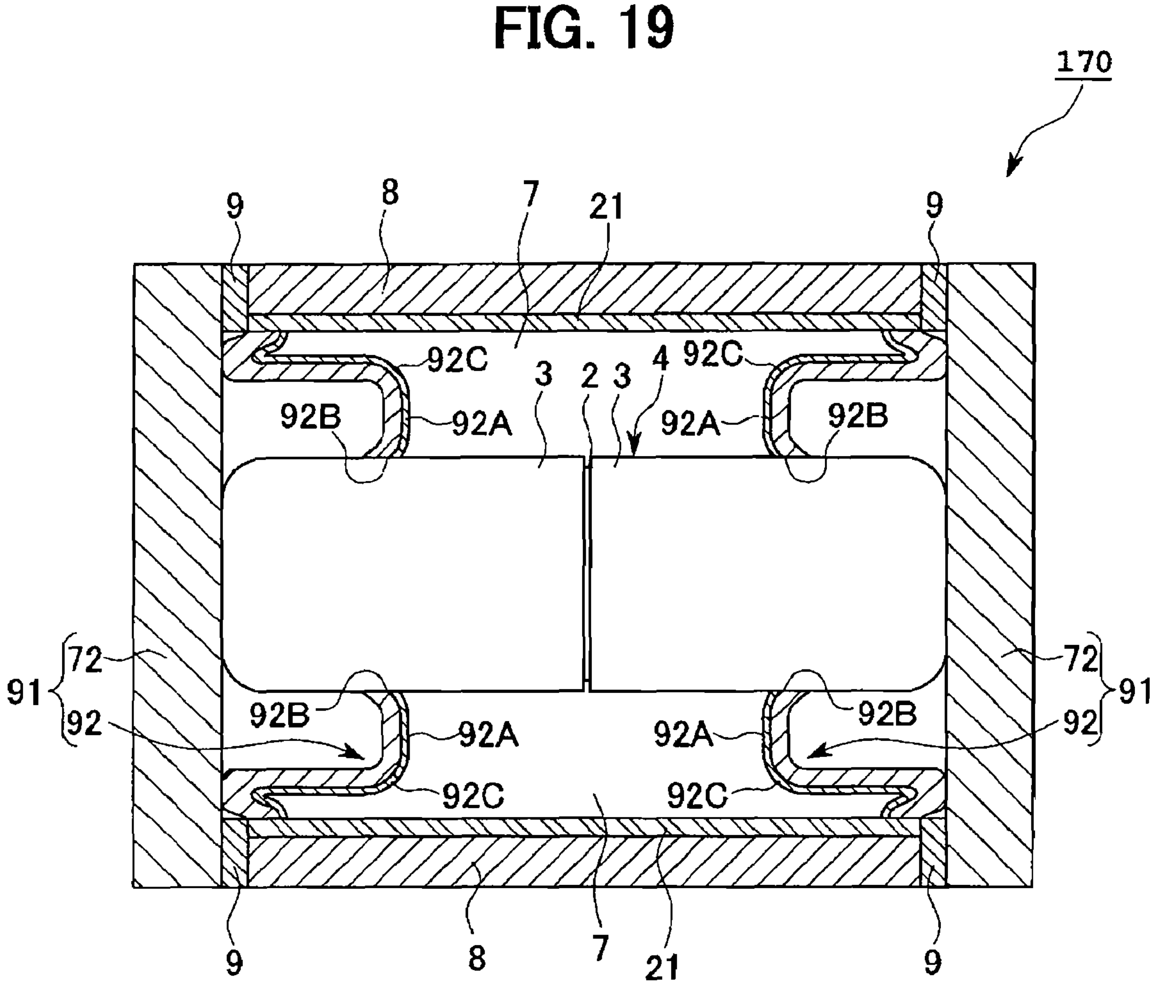
FIG. 19 is a cross-sectional view showing a surge absorber according to a first modified example of the embodiment of FIG. 18 of the present invention.

In a first modified example of the present embodiment, similar to the embodiment of FIG. 9, as shown in FIG. 19, there is provided a surge absorber 170 in which the glass coating film 21 which covers the inner wall of the barrel-shaped ceramics 8 is formed. By such a configuration, the same effect as that described above can be obtained.

Figure 20:
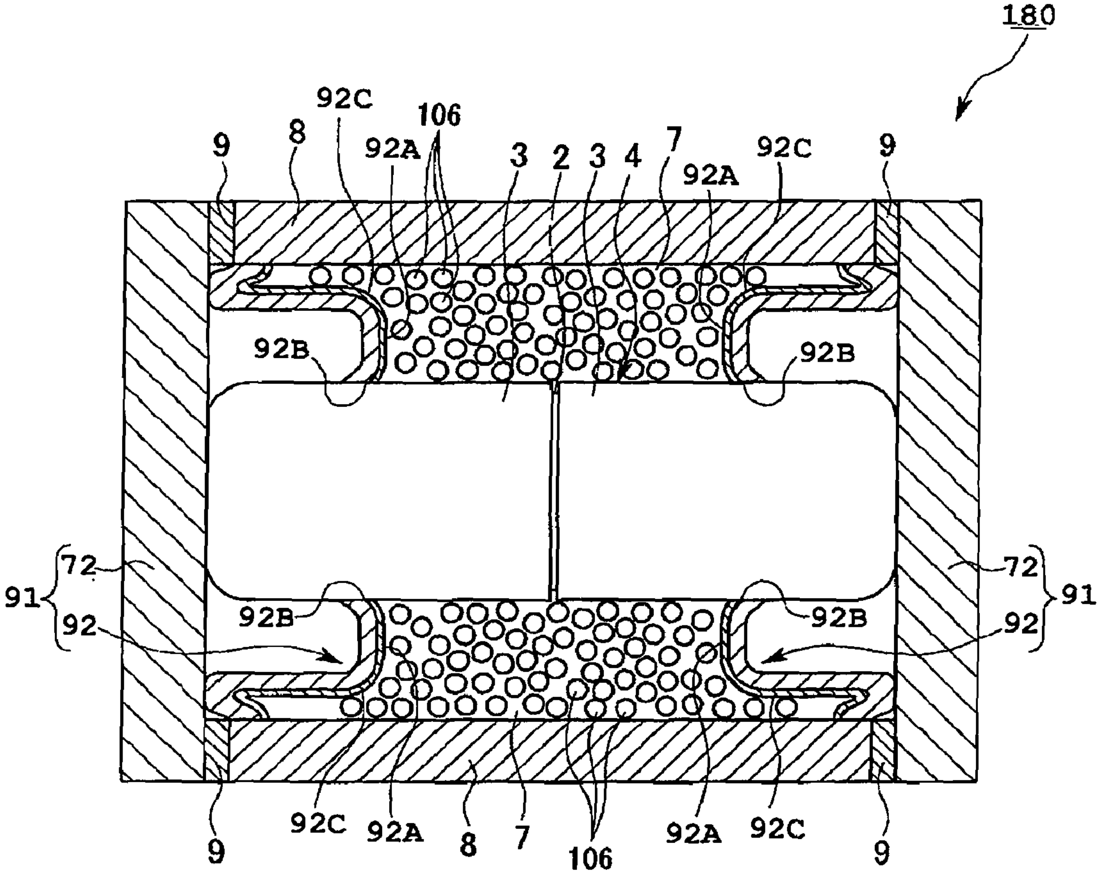
FIG. 20 is a cross-sectional view showing a surge absorber according to a second modified example of the embodiment of FIG. 18 of the present invention.

In a second modified example of the present embodiment, similar to another embodiment, as shown in FIG. 20, there is provided a surge absorber 180 in which granular glass members 106 are charged in the barrel-shaped ceramics 8. By such a configuration, the same operation and effect as those described above can be obtained.

Figure 21:
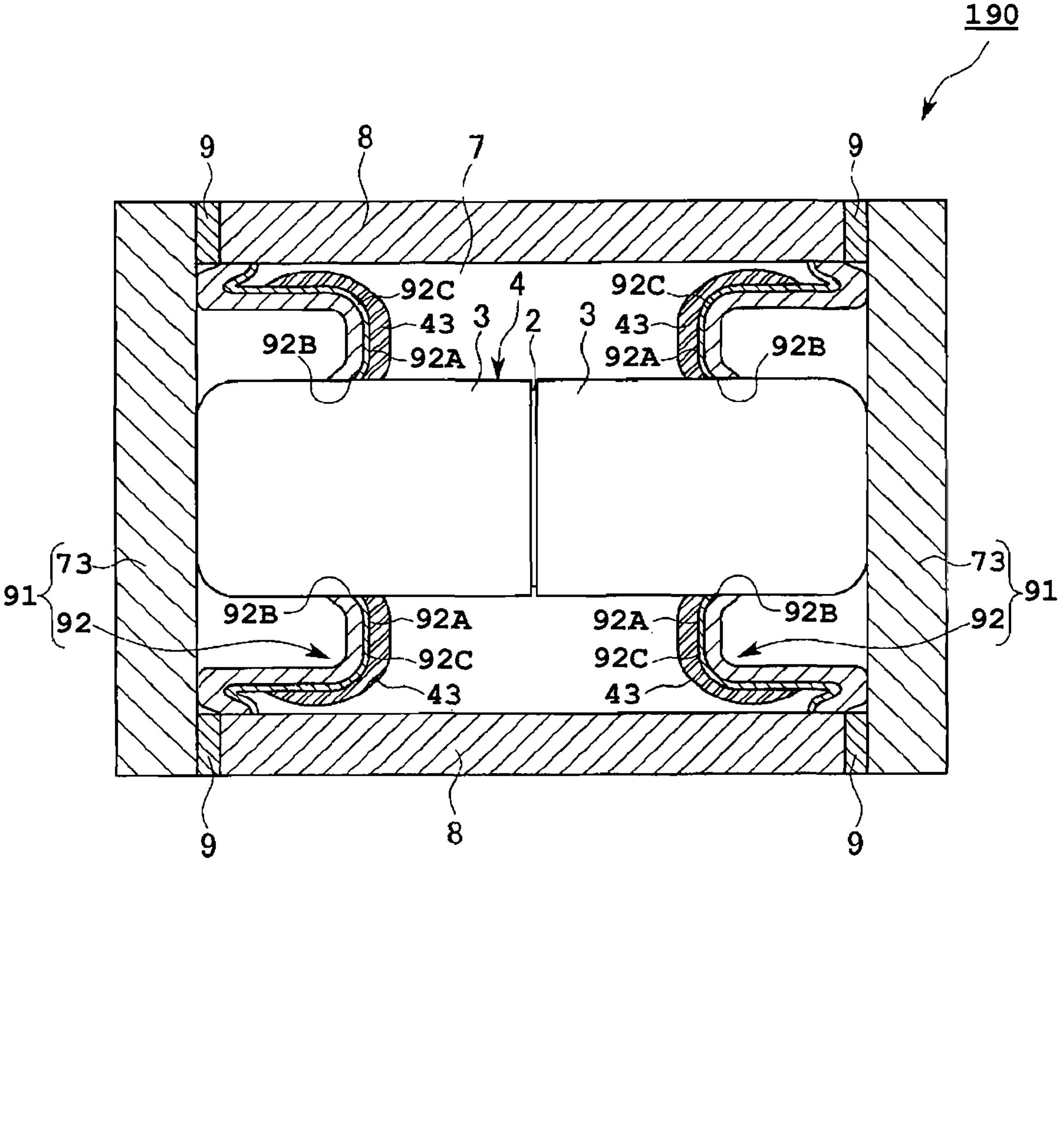
FIG. 21 is a cross-sectional view showing a surge absorber according to a third modified example of the embodiment of FIG. 18 of the present invention.

In a third modified example of the present embodiment, similar to another embodiment, as shown in FIG. 21, there is provided a surge absorber 190 in which a glass coating film 43 is coated on the surface of the bottom 92A by a method of printing and sintering a glass paste. By such a configuration, the same effect as that described above can be obtained.

EXPERIMENTAL EXAMPLE 1

Next, a surge absorber according to the present invention will be described by Experimental Example in detail with reference to FIGS. 22 and 23.

Figure 5:
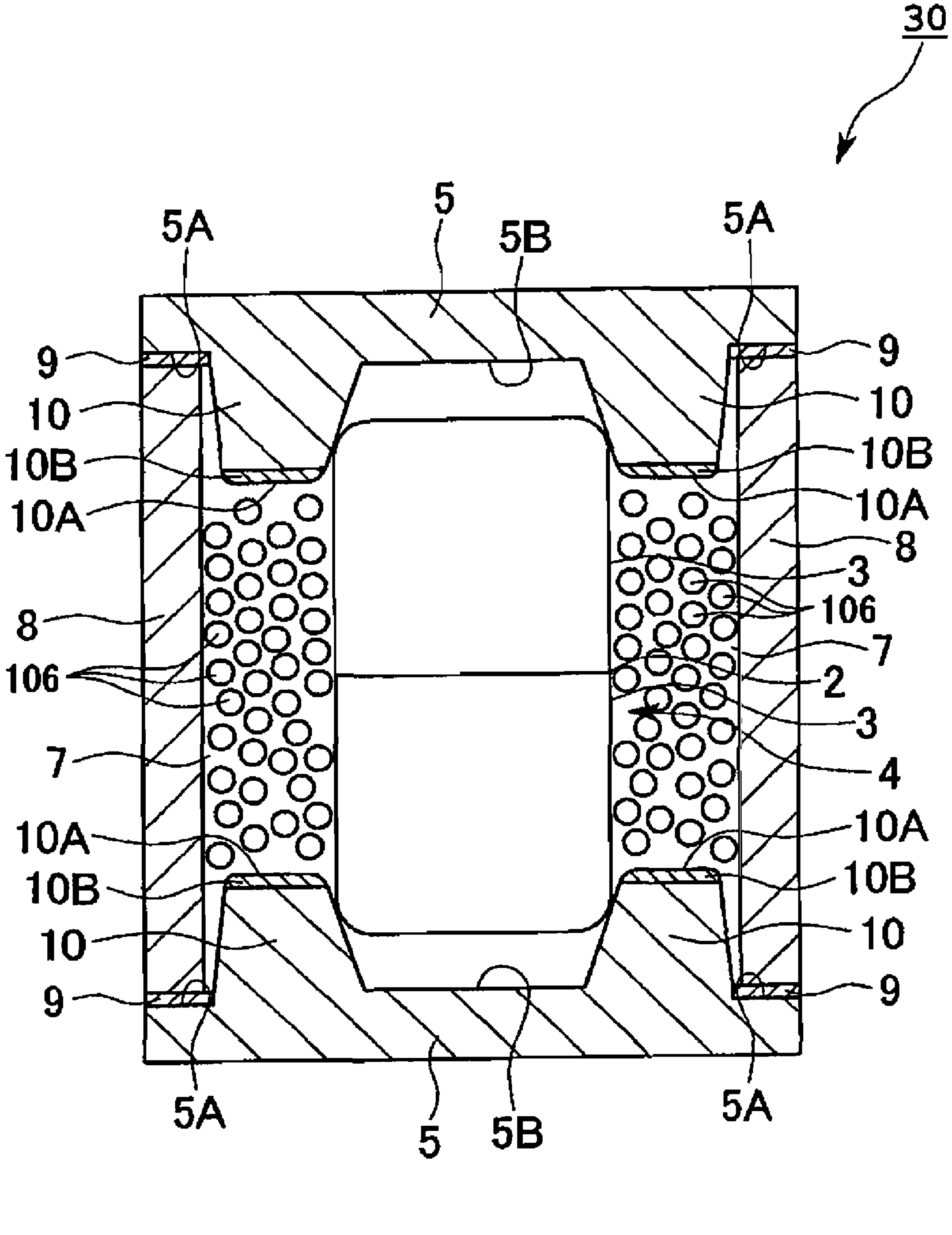
FIG. 5 is a cross-sectional view showing a surge absorber according to a further embodiment of the present invention.

The surge absorber 50 according to the embodiment of FIG. 5 and a conventional surge absorber without the oxide film 33B and the cylindrical glass member 6 were mounted on boards, respectively, and the life spans thereof were compared.

Figure 22:
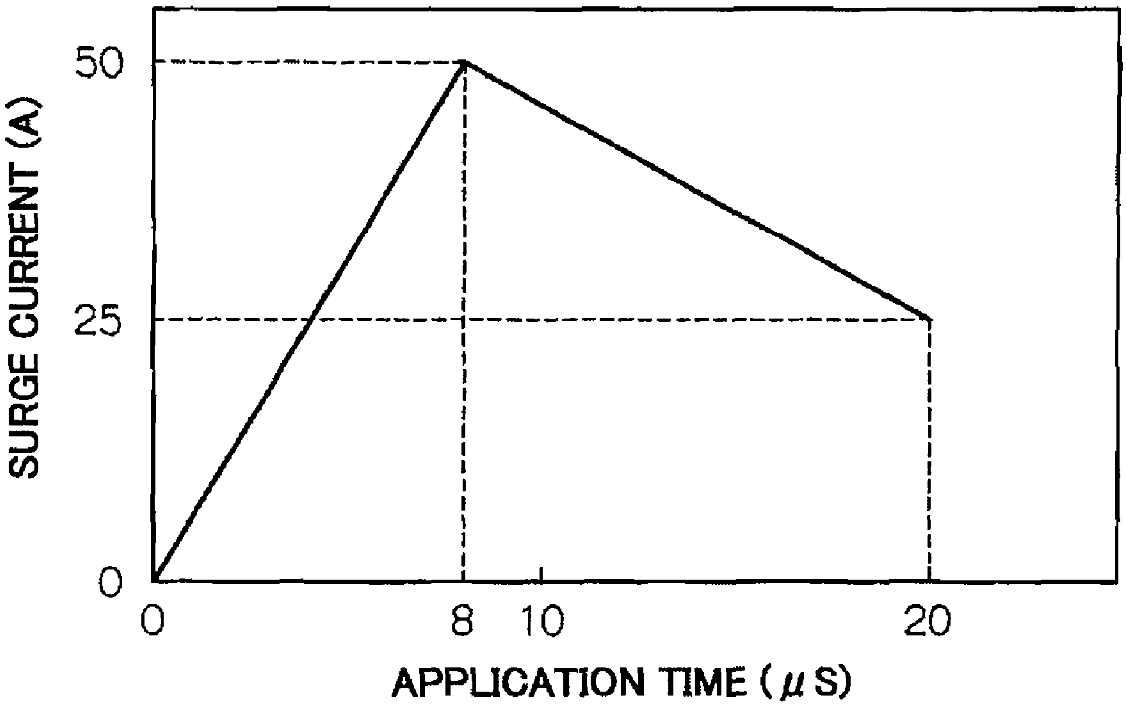
FIG. 22 is a graph showing a relationship between a current value and the time of surge current in Experimental Example of the present invention.
Figure 23:
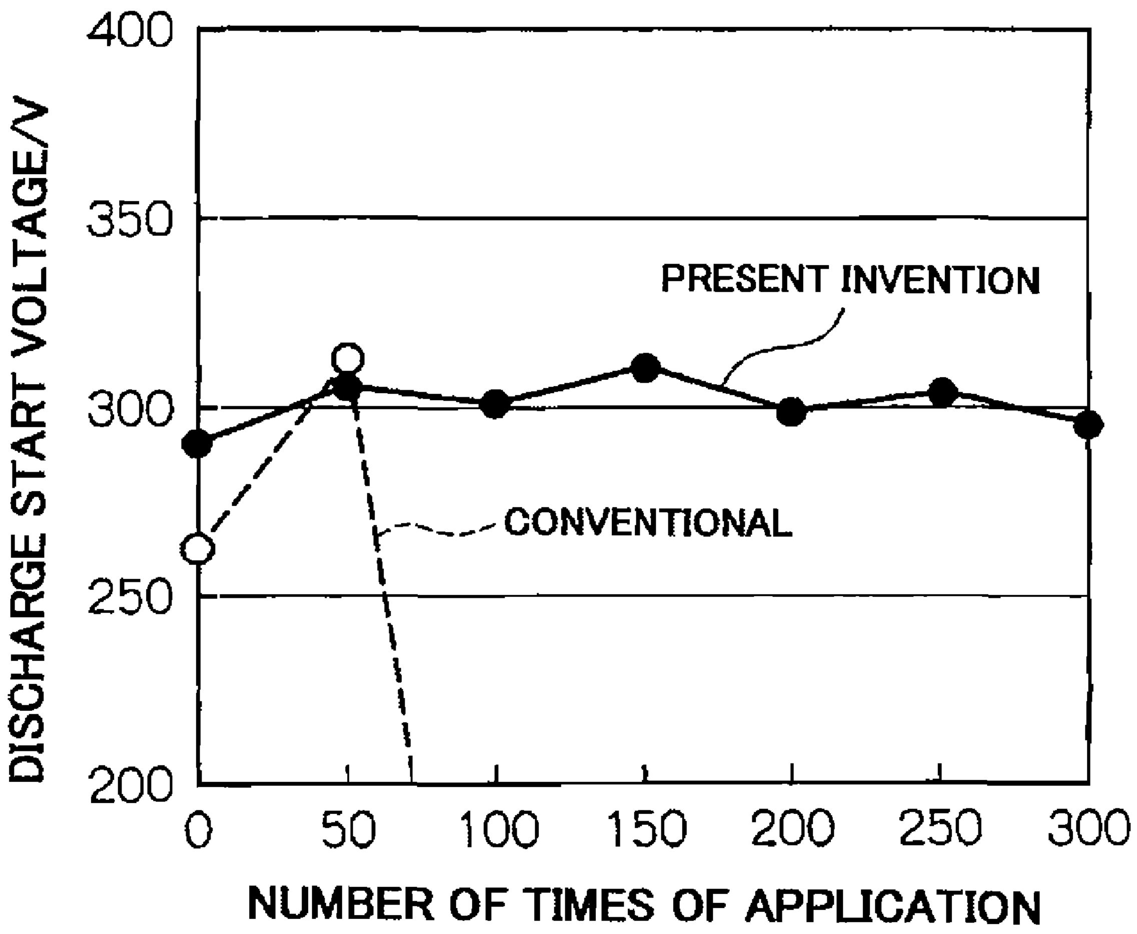
FIG. 23 is a graph showing a relationship between a discharge start voltage and the number of times of discharge of the surge absorber in Experimental Example of the embodiment of FIG. 7 of the present invention.

More specifically, in Example 1, the result of repeatedly applying surge current shown in FIG. 22 to the surge absorber by a predetermined number of times and measuring a discharge start voltage (V) between gaps at this time is shown in FIG. 23.

In the conventional surge absorber, when the surge current is repeatedly applied, a large amount of metallic component of the metal electrode of the main discharge electrode member is scattered and the metallic component is deposited in a micro gap within a relatively short time. Accordingly, the discharge start voltage between the gaps is reduced and life span ends. On the other hand, in the surge absorber 50 according to the present invention, the cylindrical glass member 6 is heated and molten in the sealing process and thus the main discharge surface 33A is covered with the glass member. Since the glass member functions as an oxidizing agent, the main discharge surface is covered with an oxide layer formed of the metallic component of the main discharge surface. Even when the oxide film 33B or the glass member which covers the main discharge surface 33A is damaged by the main discharge, the damaged portion is covered with the cylindrical glass member 6 of the other portion, which is heated and molten. Accordingly, since the metallic component of the cap electrode 33 is suppressed from being scattered upon the main discharge, the metallic component is hardly deposited in the discharge gap 2. Accordingly, the discharge start voltage between the gaps becomes stable and the long life span of the surge absorber can be realized.

Figure 26:
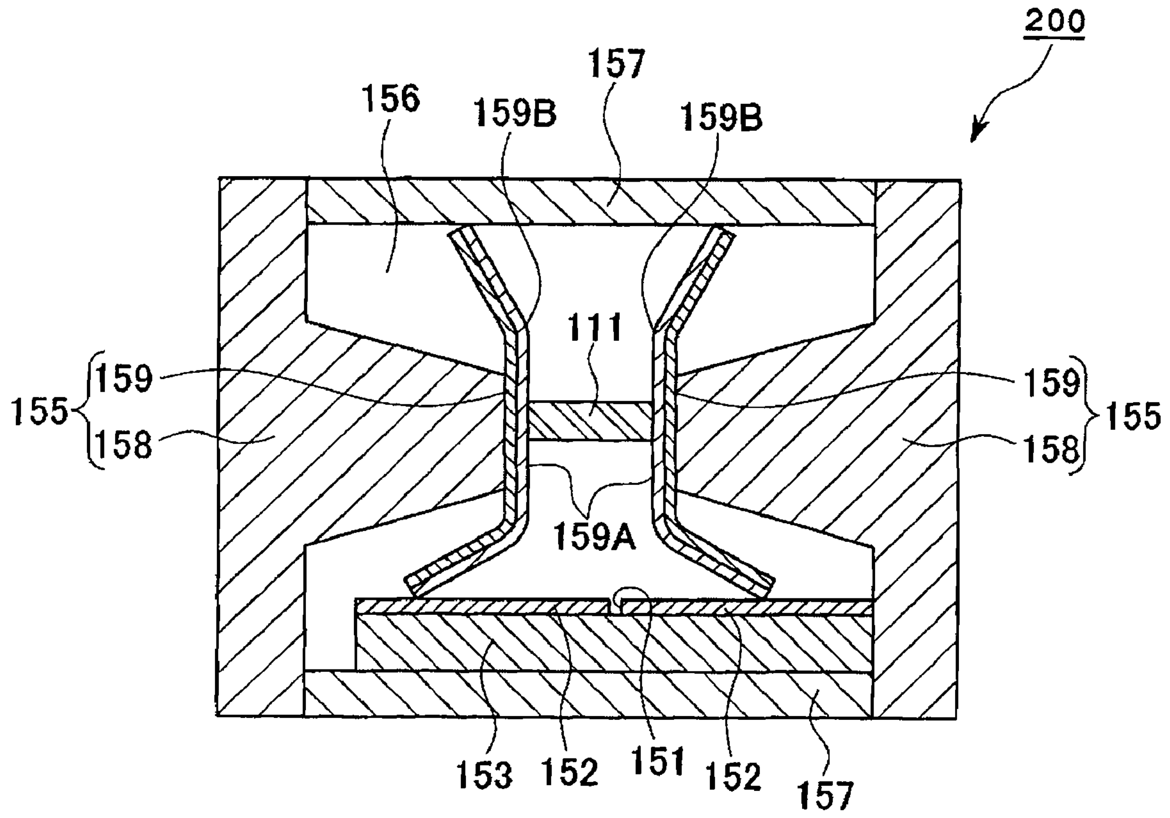
FIG. 26 is a cross-sectional view showing a surge absorber according to the present invention, other than the embodiments of the present invention.

The present invention is not limited to the above-described embodiments and may be variously modified without departing from the scope of the present invention. For example, as shown in FIG. 26, there may be provided a surge absorber 200 in which main discharge surfaces 159A which are facing surfaces of a pair of leaf spring conductors 159 are subjected to the same oxidation treatment as that of the first embodiment to form an oxide film 159B and a plate-shaped glass member 111 is interposed between the pair of main discharge surfaces 159A. By such a configuration, the same operation and effect as those described above can be obtained.

Figure 27:
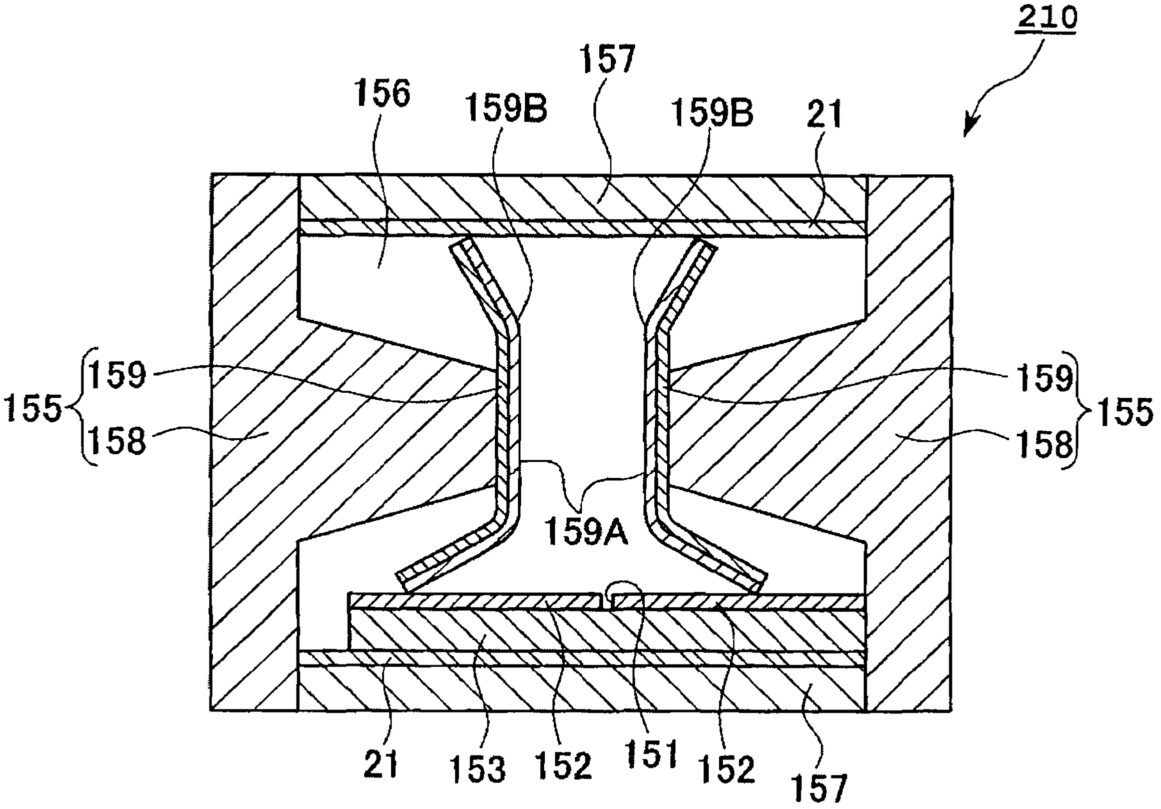
FIG. 27 is a cross-sectional view showing another surge absorber according to the present invention, other than the embodiments of the present invention.

Further, as shown in FIG. 27, there may be provided a surge absorber 210 in which the glass coating film 21 which covers the inner wall of a barrel-shaped ceramics 157 is formed. By such a configuration, the same operation and effect as those described above can be obtained.

EXPERIMENTAL EXAMPLE 2

Next, a surge absorber according to the present invention will be described by Example 2 in detail with reference to FIGS. 22 and 24.

Figure 7:
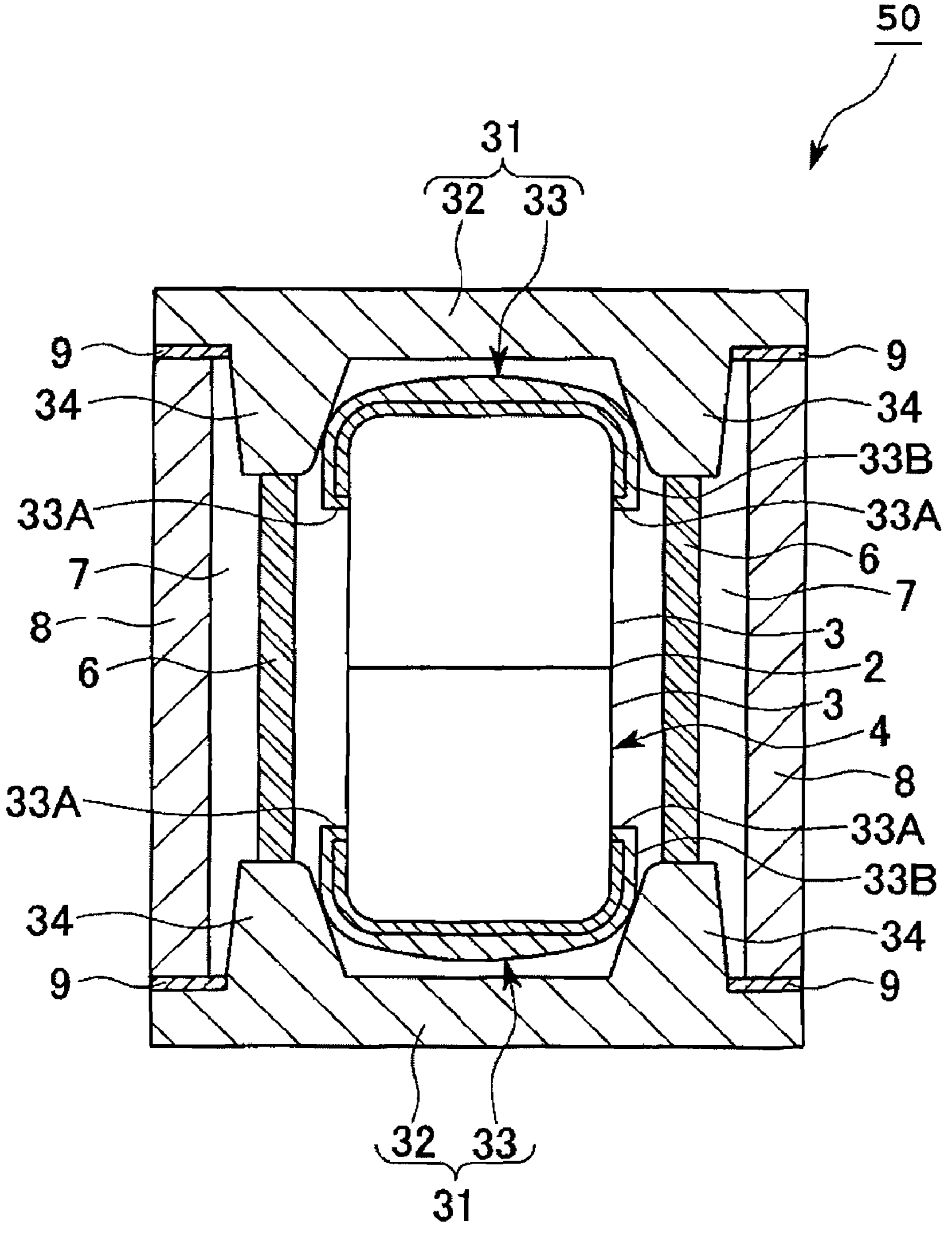
FIG. 7 is a cross-sectional view showing a surge absorber according to another embodiment of the present invention.

The surge absorber 70 according to the second modified example of the embodiment of FIG. 7 and the conventional surge absorber without the oxide film 33B and the granular glass members 106 were mounted on boards, respectively, and the life spans thereof were compared.

Figure 24:
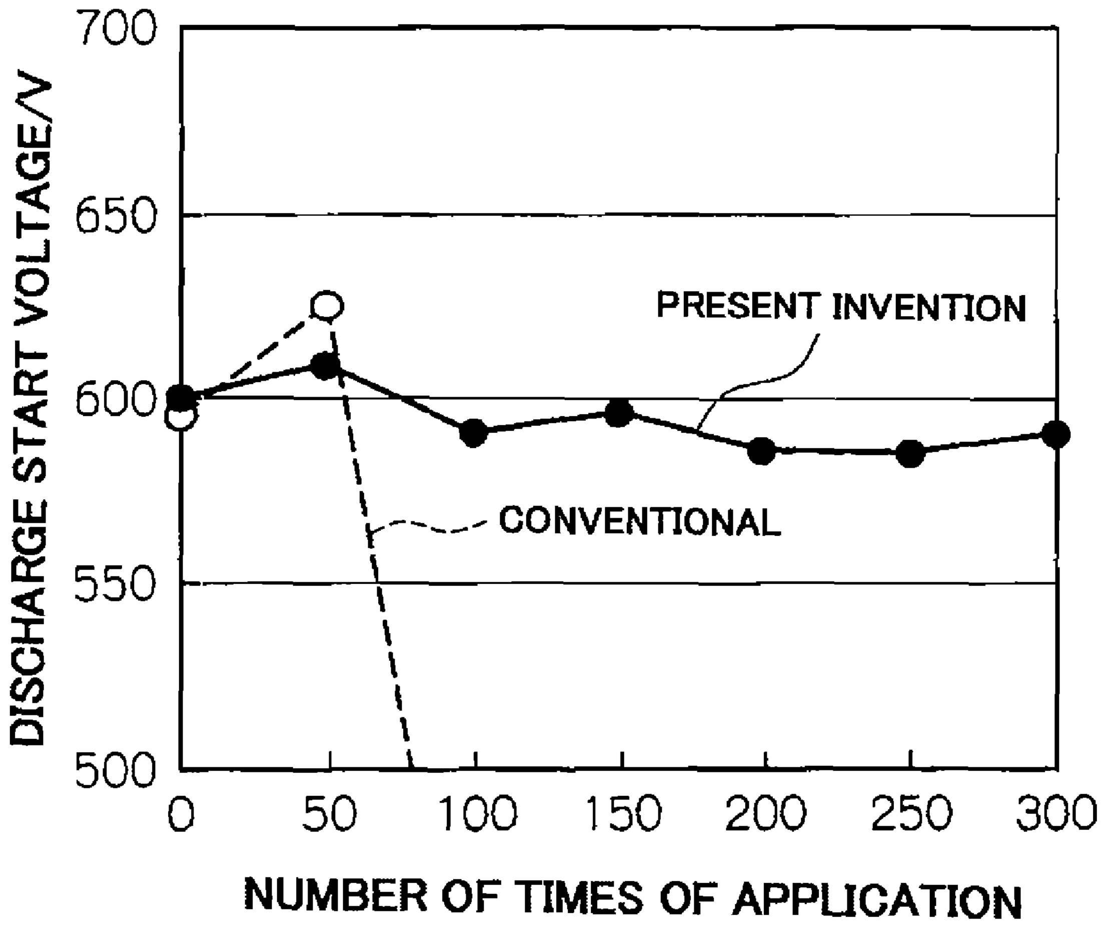
FIG. 24 is a graph showing a relationship between a discharge start voltage and the number of times of discharge of the surge absorber in Experimental Example of the second modified example of the embodiment of FIG. 7 of the present invention.

More specifically, in Example 2, the result of repeatedly applying surge current shown in FIG. 22 to the surge absorber by a predetermined number of times and measuring a discharge start voltage (V) between gaps at this time is shown in FIG. 24.

In the conventional surge absorber, when the surge current is repeatedly applied, a large amount of metallic component of the main discharge electrode member is scattered and the metallic component is deposited in a micro gap within a relatively short time. Accordingly, the discharge start voltage between the gaps is reduced and life span ends. On the other hand, in the surge absorber 70 according to the present invention, the granular glass members 106 are heated and molten and thus the main discharge surface 33A is covered with the glass member. Since the granular glass members 106 function as an oxidizing agent, the main discharge surface is covered with the oxide layer formed of the metallic component of the main discharge surface. Accordingly, since the metallic component of the cap electrode 33 is suppressed from being scattered, the metallic component is hardly deposited in the discharge gap 2. Accordingly, the discharge start voltage between the gaps becomes stable and the long life span of the surge absorber can be realized.

The present invention is not limited to the above-described embodiments and may be variously modified without departing from the scope of the present invention.

For example, the shape of the granular glass member is not limited to the granular shape and may be columnar, cylindrical or irregular shape.

Figure 28:
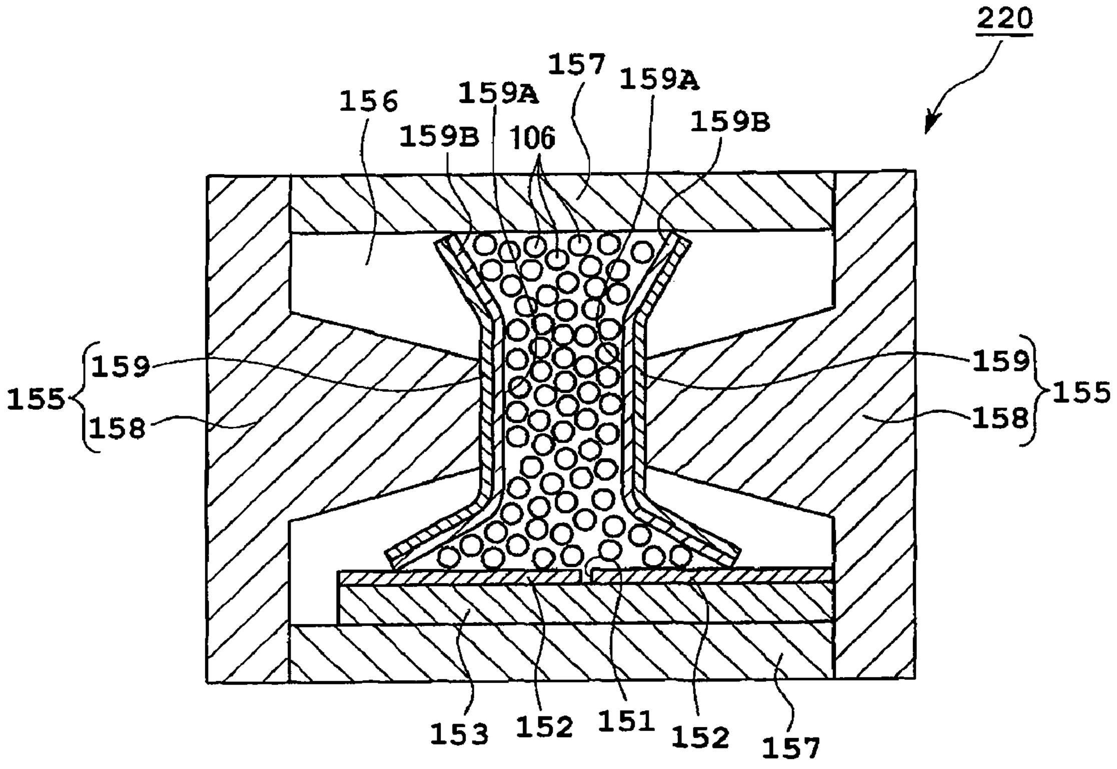
FIG. 28 is a cross-sectional view showing still another surge absorber according to the present invention, other than the embodiments of the present invention.

As shown in FIG. 28, there may be provided a surge absorber 220 in which main discharge surfaces 159A which are facing surfaces of a pair of leaf spring conductors 159 are subjected to the same oxidation treatment as that of the initial embodiment to form an oxide film 159B and the granular glass members 106 are charged. By such a configuration, the same operation and effect as those described above can be obtained.

EXPERIMENTAL EXAMPLE 3

Next, a surge absorber according to the present invention will be described by Experimental Example in detail with reference to FIGS. 22 and 25.

The surge absorber 80 according to the third modified example of the fifth embodiment and the conventional surge absorber without the oxide film 33B and the glass coating film 25 were mounted on boards, respectively, and the life spans thereof were compared.

Figure 25:
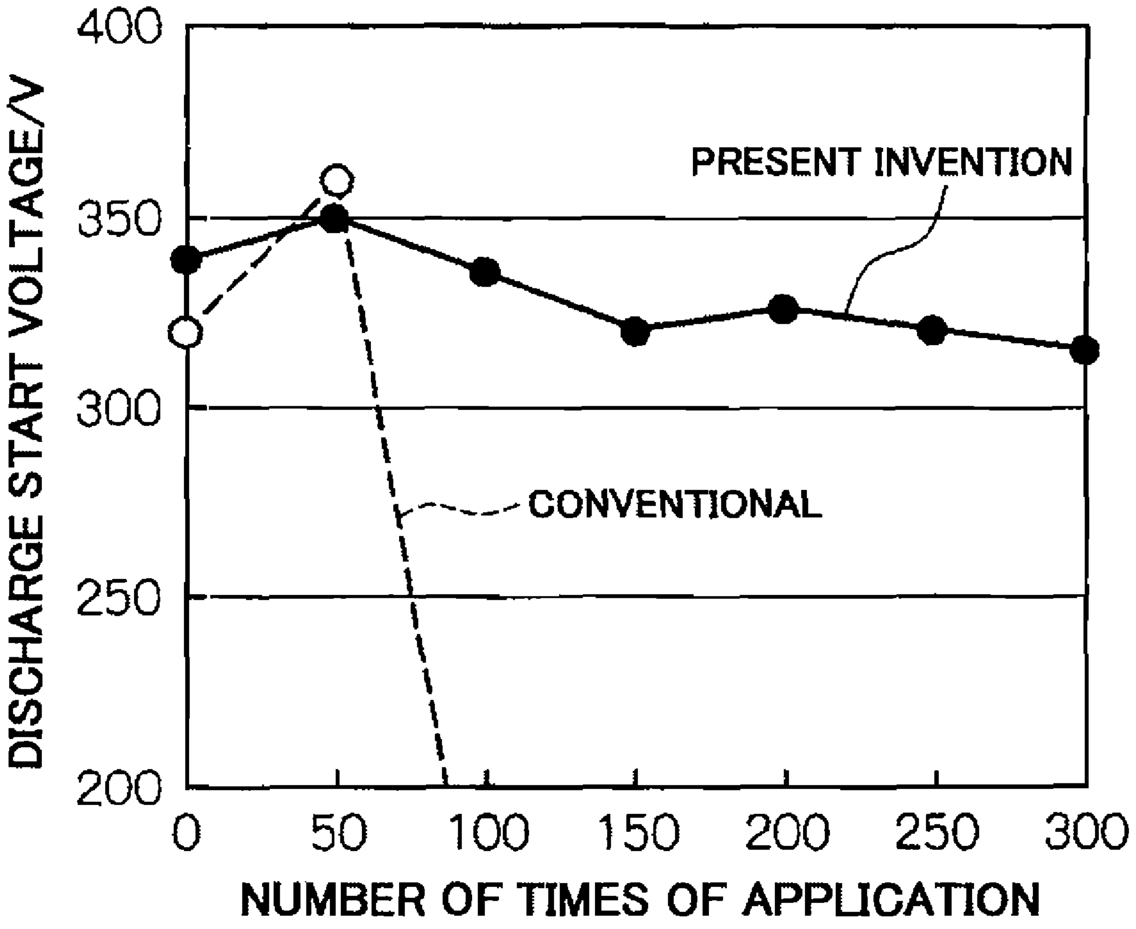
FIG. 25 is a graph showing a relationship between a discharge start voltage and the number of times of discharge of the surge absorber in Experimental Example of the third modified example of the embodiment of FIG. 7 of the present invention.

More specifically, in Experimental Example, surge current shown in FIG. 22 was repeatedly applied to the surge absorber by a predetermined number of times and the result of measuring a discharge start voltage (V) between gaps at this time is shown in FIG. 25.

In the conventional surge absorber, when the surge current is repeatedly applied, a large amount of metallic component of the main discharge electrode member is scattered and the metallic component is deposited in a micro gap within a relatively short time. Accordingly, the discharge start voltage between the gaps is reduced and life span ends. On the other hand, in the surge absorber 80 according to the present invention, since the metallic component of the cap electrode 33 is suppressed from being scattered by the glass coating film 25 and the oxide film 33B, the metallic component is hardly deposited in the discharge gap 2. Accordingly, it can be seen that the discharge start voltage between the gaps becomes stable.

The present invention is not limited to the above-described embodiments and may be variously modified without departing from the scope of the present invention.

Figure 29:
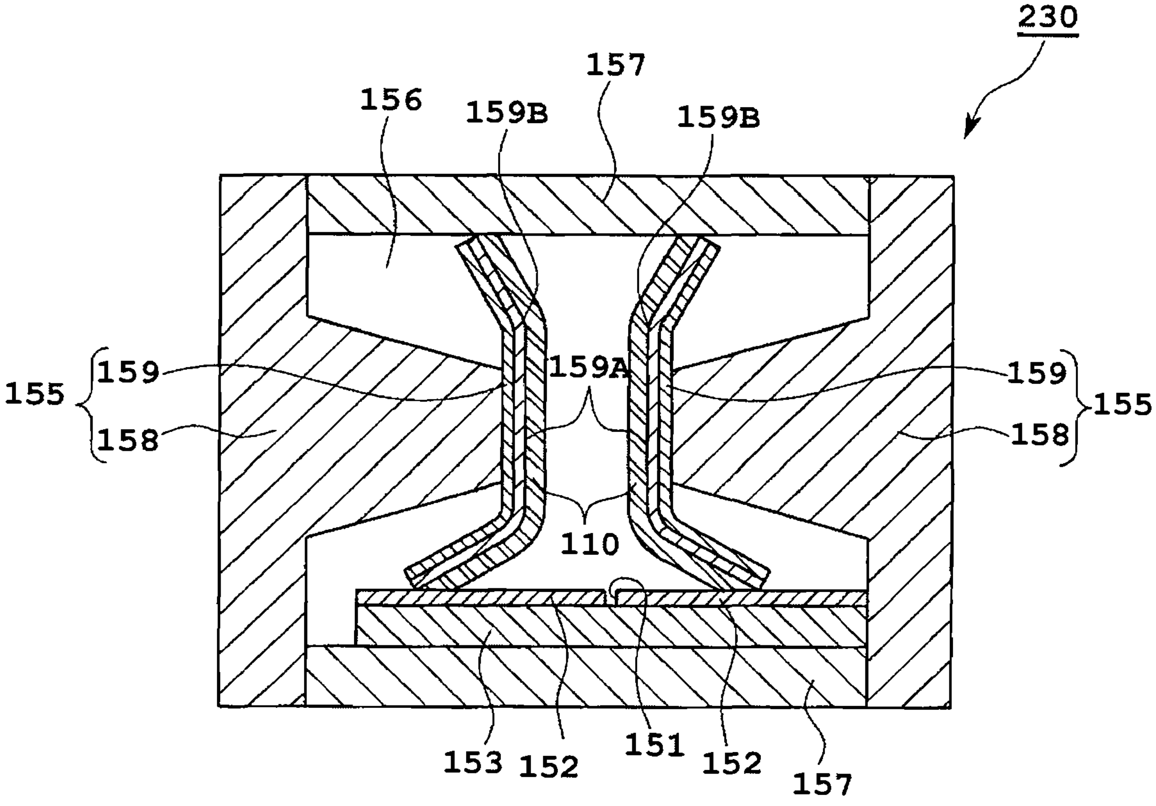
FIG. 29 is a cross-sectional view showing still another surge absorber according to the present invention, other than the embodiments of the present invention.
Figure 30:
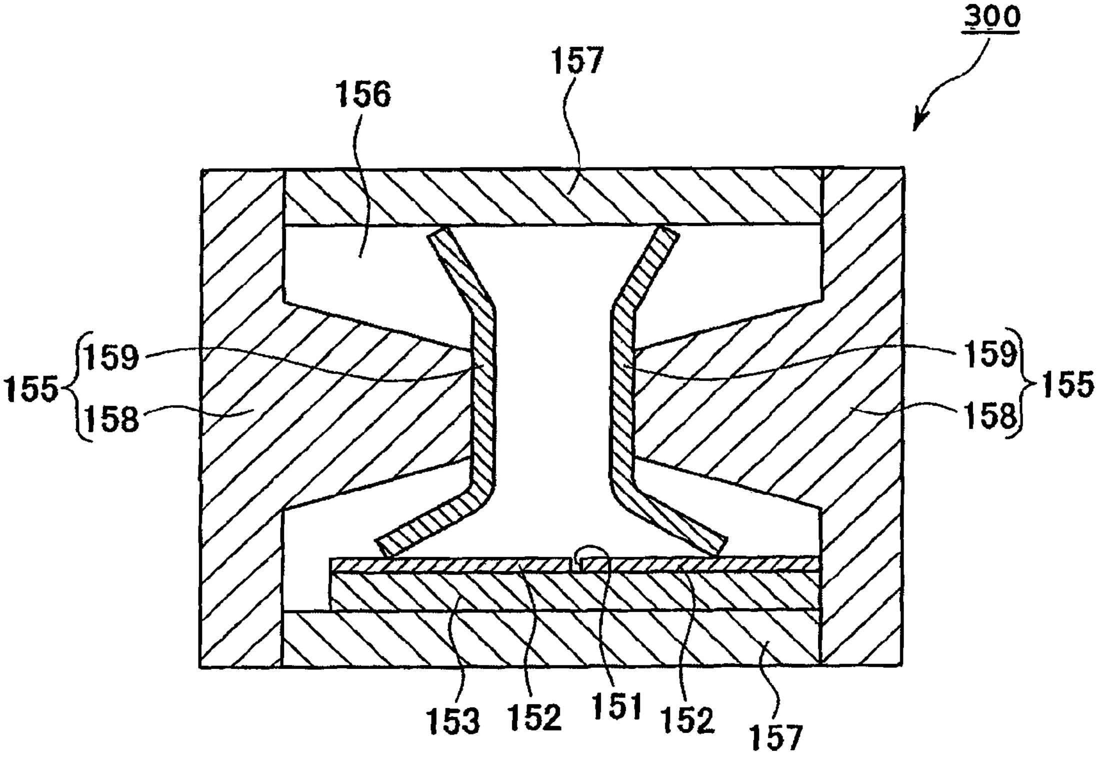
FIG. 30 is a cross-sectional view showing a conventional surge absorber.

As shown in FIG. 29, there may be provided a surge absorber 230 in which main discharge surfaces 159A which are facing surfaces of a pair of leaf spring conductors 159 are subjected to the same oxidation treatment as that of the first embodiment to form an oxide film 159B and the main discharge surface 159A is covered with a glass coating film 110. By such a configuration, the same operation and effect as those described above can be obtained.

In three Experimental Examples, the conductive coating film may be formed of silver (Ag), silver/palladium (Ag/Pd) alloy, tin oxide ($SnO_2$), aluminum (Al), nickel (Ni), copper (Cu), titanium (Ti), tantalum (Ta), tungsten (W), silicon carbide (SiC), barium alumina (BaAl), carbon (C), silver/platinum (Ag/Pt) alloy, titanium oxide (TiO), titanium carbide (TiC) or titanium carbonitride (TiCN).

The main discharge electrode member may be Cu-based alloy or Ni-based alloy.

In Experimental Example 1, the cylindrical glass member may have a plate shape or any other shape, as long as it is present in the barrel-shaped ceramics. In Experimental Example 2, although granular glass members are charged in the barrel-shaped ceramics, foam glass may be discharged instead. In Experimental Example 3, the glass coating film may be coated on the entire surface of the main discharge electrode member, instead of the main discharge surface.

A member containing glass of crystal phase instead of the $SiO_2$ may be used.

The metallization layers of the both end surfaces of the barrel-shaped ceramics may be formed of silver (Ag), copper (Cu) or gold (Au), and sealing may be performed using only an active metal brazing material without using the metallization layer.

The composition of the sealing gas is adjusted so as to obtain a desired electrical property and may be, for example, air, argon (Ar), nitrogen ($N_2$), neon (Ne), helium (He), xenon (Xe), hydrogen ($H_2$), $SF_6$, $CF_4$, $C_2F_6$, $C_3F_8$, carbon dioxide ($CO_2$), or a mixture thereof.

According to a surge absorber of the present invention, a glass member is molten upon a sealing process or main discharge and functions as a covering agent or an oxidizing agent, and a main discharge surface is covered with the glass member or an oxide layer formed of a metallic component of the main discharge surface. Accordingly, it is possible to suppress the metallic component of the main discharge surface from being scattered. Even when the glass member or the oxide layer which covers the main discharge surface is damaged, the glass member of the other portion is heated and molten and thus the damaged portion is covered.

According to a surge absorber of the present invention, since a main discharge surface is covered with a glass member, it is possible to suppress the metallic component of the main discharge surface from being scattered. Even when the glass member is damaged upon the main discharge, the glass member of the other portion, which is heated and molten, functions as a covering agent or an oxidizing agent and thus the metallic component of the main discharge surface is suppressed from being scattered. Accordingly, a long life span of the surge absorber can be realized.

The invention claimed is:

1. A surge absorber comprising:

an insulating member in which conductive coating films are separately formed on a main surface thereof via a discharge gap;

a pair of main discharge electrode members which face each other and are in contact with the conductive coating films; and an insulating tube in which the insulating member is enclosed together with sealing gas, wherein a glass member is enclosed in the insulating tube, wherein oxide films are formed on main discharge surfaces which are facing surfaces of the pair of main discharge electrode members by an oxidation treatment.

2. The surge absorber according to claim 1, wherein the glass member covers an inner wall of the insulating tube.

3. A surge absorber comprising:

an insulating member in which conductive coating films are separately formed on a main surface thereof via a discharge gap;

a pair of main discharge electrode members which face each other and are in contact with the conductive coating films; and an insulating tube in which the insulating member is enclosed together with sealing gas, wherein a glass member is charged in the insulating tube to extend from one of the pair of main discharge electrode members to the other of the pair of main discharge electrode members, wherein oxide films are formed by an oxidation treatment on main discharge surfaces which are facing surfaces of the pair of main discharge electrode members.

4. The surge absorber according to claim 3, wherein the glass member has a granular shape.

5. The surge absorber according to claim 4, wherein the glass member is foam glass.

6. A surge absorber comprising:

an insulating member in which conductive coating films are separately formed on a main surface thereof via a discharge gap;

a pair of main discharge electrode members which face each other and are in contact with the conductive coating films; and an insulating tube in which the insulating member is enclosed together with sealing gas, wherein main discharge surfaces which are facing surfaces of the pair of main discharge electrode members are covered with a glass member, wherein oxide films are formed on the main discharge surfaces by an oxidation treatment.

* * * * *